(12) United States Patent
Karnik et al.

(10) Patent No.: US 12,083,483 B2
(45) Date of Patent: Sep. 10, 2024

(54) COATINGS TO IMPROVE THE SELECTIVITY OF ATOMICALLY THIN MEMBRANES

(71) Applicant: Massachusetts Institute of Technology, Cambridge, MA (US)

(72) Inventors: Rohit N. Karnik, Cambridge, MA (US); Doojoon Jang, Daejeon (KR)

(73) Assignee: Massachusetts Institute of Technology, Cambridge, MA (US)

(*) Notice: Subject to any disclaimer, the term of this patent is extended or adjusted under 35 U.S.C. 154(b) by 298 days.

(21) Appl. No.: 16/457,349

(22) Filed: Jun. 28, 2019

(65) Prior Publication Data

US 2020/0001245 A1 Jan. 2, 2020

Related U.S. Application Data

(60) Provisional application No. 62/691,479, filed on Jun. 28, 2018.

(51) Int. Cl.
*B01D 69/12* (2006.01)
*B01D 69/02* (2006.01)
*B01D 71/02* (2006.01)

(52) U.S. Cl.
CPC ......... *B01D 69/1216* (2022.08); *B01D 69/02* (2013.01); *B01D 71/0211* (2022.08); *B01D 69/12* (2013.01)

(58) Field of Classification Search
CPC ...... B01D 2255/20707; B01D 2311/10; B01D 2311/14; B01D 2311/2688; B01D 2323/30; B01D 2325/20; B01D 61/362; B01D 67/0081; B01D 69/04; B01D 69/08; B01D 69/10; B01D 69/12; B01D 69/125; B01D 71/34; B01D 71/42; B01D 71/70

See application file for complete search history.

(56) References Cited

U.S. PATENT DOCUMENTS

| | | | |
|---|---|---|---|
| 3,457,171 A | 7/1969 | Flowers et al. |
| 3,839,201 A | 10/1974 | Miller |
| 3,980,456 A | 9/1976 | Browall |
| 4,337,154 A | 6/1982 | Fukuchi et al. |
| 4,767,422 A | 8/1988 | Bikson et al. |
| 4,894,160 A | 1/1990 | Abe et al. |
| 5,224,972 A | 7/1993 | Frye et al. |
| 5,510,176 A | 4/1996 | Nakamura et al. |

(Continued)

FOREIGN PATENT DOCUMENTS

| | | |
|---|---|---|
| CN | 102574071 A | 7/2012 |
| DE | 102010001504 A1 | 8/2011 |

(Continued)

OTHER PUBLICATIONS

Song et al., Charge-Gated Ion Transport through Polyelectrolyte Intercalated Amine Reduced Graphene Oxide Membranes, 9 ACS Appl. Mater. Interfaces, 414182, 41482-41495 (2017) ("Song"). (Year: 2017).*

(Continued)

*Primary Examiner* — Terry K Cecil
(74) *Attorney, Agent, or Firm* — Wolf, Greenfield & Sacks, P.C.

(57) ABSTRACT

Disclosed embodiments are related to mitigating leaks in membranes and/or improving the selectivity of membranes.

22 Claims, 12 Drawing Sheets

(56) References Cited

U.S. PATENT DOCUMENTS

| | | |
|---|---|---|
| 5,645,891 A | 7/1997 | Liu et al. |
| 5,672,388 A | 9/1997 | McHenry et al. |
| 6,117,341 A | 9/2000 | Bray et al. |
| 6,730,145 B1 | 8/2004 | Li |
| 8,361,321 B2 | 1/2013 | Stetson et al. |
| 8,376,100 B2 | 2/2013 | Avadhany et al. |
| 9,324,995 B2 | 4/2016 | Ryhanen et al. |
| 9,505,192 B2 | 11/2016 | Stoltenberg et al. |
| 9,901,879 B2 | 2/2018 | Karnik et al. |
| 9,997,778 B2 | 6/2018 | Cao et al. |
| 11,524,898 B2 | 12/2022 | Karnik et al. |
| 2002/0088748 A1 | 7/2002 | Allcock et al. |
| 2003/0185741 A1 | 10/2003 | Matyjaszewski et al. |
| 2006/0201884 A1 | 9/2006 | Kulprathipanja et al. |
| 2007/0017861 A1 | 1/2007 | Foley et al. |
| 2007/0256562 A1 | 11/2007 | Routkevitch et al. |
| 2008/0020197 A1 | 1/2008 | Ayers et al. |
| 2008/0149561 A1 | 6/2008 | Chu et al. |
| 2009/0000651 A1 | 1/2009 | Qiao |
| 2009/0120874 A1 | 5/2009 | Jensen et al. |
| 2009/0155678 A1 | 6/2009 | Less et al. |
| 2009/0321355 A1 | 12/2009 | Ratto et al. |
| 2010/0212504 A1 | 8/2010 | Shimizu et al. |
| 2011/0056892 A1 | 3/2011 | Strauss et al. |
| 2011/0108521 A1 | 5/2011 | Woo et al. |
| 2011/0139707 A1 | 6/2011 | Siwy et al. |
| 2011/0223494 A1 | 9/2011 | Feaver et al. |
| 2012/0000845 A1 | 1/2012 | Park et al. |
| 2012/0048804 A1 | 3/2012 | Stetson et al. |
| 2012/0108418 A1 | 5/2012 | Nair et al. |
| 2012/0171376 A1 | 7/2012 | Dodge |
| 2012/0186980 A1 | 7/2012 | Mishra et al. |
| 2012/0255899 A1 | 10/2012 | Choi et al. |
| 2012/0295091 A1 | 11/2012 | Behabtu et al. |
| 2013/0040283 A1 | 2/2013 | Star et al. |
| 2013/0105417 A1 | 5/2013 | Stetson et al. |
| 2013/0192460 A1 | 8/2013 | Miller et al. |
| 2013/0192461 A1 | 8/2013 | Miller et al. |
| 2013/0270188 A1 | 10/2013 | Karnik et al. |
| 2013/0305927 A1 | 11/2013 | Choi et al. |
| 2013/0309776 A1 | 11/2013 | Drndic et al. |
| 2013/0314844 A1 | 11/2013 | Chen et al. |
| 2014/0030482 A1 | 1/2014 | Miller et al. |
| 2014/0138314 A1 | 5/2014 | Liu et al. |
| 2014/0262820 A1 | 9/2014 | Kuan et al. |
| 2014/0263035 A1 | 9/2014 | Stoltenberg et al. |
| 2014/0272286 A1 | 9/2014 | Stoltenberg et al. |
| 2014/0311967 A1 | 10/2014 | Grossman et al. |
| 2014/0332814 A1 | 11/2014 | Peng et al. |
| 2015/0010714 A1 | 1/2015 | Appleton et al. |
| 2015/0044556 A1 | 2/2015 | Wang et al. |
| 2015/0122727 A1 | 5/2015 | Karnik et al. |
| 2015/0224451 A1 | 8/2015 | Miyahara et al. |
| 2015/0231557 A1 | 8/2015 | Miller et al. |
| 2015/0258506 A1* | 9/2015 | Mi .................... C01B 32/198 156/273.1 |
| 2015/0273401 A1 | 10/2015 | Miller et al. |
| 2016/0009049 A1 | 1/2016 | Stoltenberg et al. |
| 2016/0051942 A1 | 2/2016 | Park et al. |
| 2016/0231307 A1 | 8/2016 | Xie |
| 2016/0340797 A1 | 11/2016 | Ozyilmaz et al. |
| 2017/0021366 A1 | 1/2017 | Chapman et al. |
| 2017/0154975 A1 | 6/2017 | Liu et al. |
| 2017/0175258 A1 | 6/2017 | Robinson et al. |
| 2017/0296972 A1 | 10/2017 | Sinton et al. |
| 2017/0368508 A1 | 12/2017 | Grossman et al. |
| 2018/0071684 A1 | 3/2018 | Nair et al. |
| 2018/0185791 A1 | 7/2018 | Karnik et al. |

FOREIGN PATENT DOCUMENTS

| | | | | |
|---|---|---|---|---|
| EP | 2511002 A1 * | 10/2012 | ........... | B01D 53/228 |
| WO | 2004/085043 A1 | 10/2004 | | |
| WO | 2010/030382 A1 | 3/2010 | | |
| WO | 2010/043914 A2 | 4/2010 | | |
| WO | 2010/126686 A2 | 11/2010 | | |
| WO | WO-2013138698 A1 * | 9/2013 | ........... | B01D 53/228 |
| WO | WO-2014088556 A1 * | 6/2014 | ........... | B01D 53/228 |

OTHER PUBLICATIONS

Zhao et al., Mimicking pH-Gated Ionic Channels by Polyelectrolyte Complex Confinement Inside a Single Nanopore, 33 Langmuir, 3484, 3484-3490 (2017) ("Zhao"). (Year: 2017).*

International Search Report and Written Opinion for PCT/US2019/039937 mailed Sep. 24, 2019.

Boretti et al., Outlook for graphene-based desalination membranes. Clean Water. 2018;1(5):1-11.

Wang et al., Fundamental transport mechanisms, fabrication and potential applications of nanoporous atomically thin membranes. Nat Nanotechnol. Jun. 6, 2017;12(6):509-522. doi: 10.1038/nnano.2017.72.

U.S. Appl. No. 16/724,139, filed Dec. 20, 2019, Grossman et al.
U.S. Appl. No. 16/860,054, filed Apr. 27, 2020, Karnik et al.

Aleman et al., Transfer-Free Batch Fabrication of Large-Area Suspended Graphene Membranes, Acsnano, vol. 4, No. 8, pp. 4762-4768 (Jul. 6, 2010).

Allen et al., Honeycomb carbon: a review of graphene. Chem Rev. Jan. 2010;110(1):132-45. doi: 10.1021/cr900070d, Epub Jul. 17, 2009.

Apel, Invited Talk: Track etching technique in membrane technology. Radiation Measurements. 2001. 34:559-66.

Bagri et al. Structural evolution during the reduction of chemically derived graphene oxide. Nat Chem. 2010; 2:581-587.

Beu et al., Model analysis of the fragmentation of large H20 and NH3 clusters based on MD simulations. Eur Phys J D. Dec. 2003;27(3):223-9. doi: 10.1140/epjd/e2003-00268-4.

Bhattacharya et al., Grafting: a versatile means to modify polymers; Techniques, factors, and applications. Prog Polym Sci. 2004; 29:767-814.

Blankenburg et al., Porous graphene as an atmospheric nanofilter. Small. Oct. 2010;6(20):2266-71.

Boukai et al. Efficiency enhancement of copper contaminated radial p-n junction solar cells. Chem Phys Lett. 2011; 501:153-158.

Boutilier et al., Implications of Permeation through Intrinsic Defects in Graphene on the Design of Defect-Tolerant Membranes for Gas Separation. ACS Nano. 2014. 891): 841-9.

Boutilier et al., Molecular Sieving Across Centimeter-Scale Single-Layer Nanoporous Graphene Membranes. ACS Nano. Jun. 27, 2017;11(6):5726-5736. doi: 10.1021/acsnano.7b01231.

Chang et al. Densely packed arrays of ultra-high-aspect-ratio silicon nanowires fabricated using block-copolymer lithography and metal-assisted etching. Adv Funct Mater. 2009; 19:2495-2500.

Chowdhury et al. Fullerenic nanostructures in flames. J Mater Res. 1996; 11:341-347.

Chu, Plugging up leaky graphene. MIT News. May 8, 2015, 3 pages. Http://news.mit.edu/2015/repair-graphene-leaks-0508.

Cohen-Tanugi et al., Water Desalination Across Nanoporous Graphene, Nano Letters, vol. 12, pp. 3602-3608 (2012).

Cohen-Tanugi et al., Quantifying the potential of ultra-permeable membranes for water desalination. Energy & Environmental Science. 2014; 7:1134-1141.

Deng et al. Developments and new applications of UV-induced surface graft polymerizations. Progress in Polymer Science. 2009; 34(2):156-193.

Du et al., Separation of Hydrogen and Nitrogen Gases with Porous Graphene Membrane. J of Physical Chemistry. 2011.115: 23261-6.

Erickson et al., Determination of the local chemical structure of graphene oxide and reduced graphene oxide. Adv Mater. 2010; 22:4467-4472.

Fang et al. Modification of polyethersulfone membrane by grafting bovine serum albumin on the surface of polyethersulfone/poly(acrylonitrile-co-acrylic acid) blended membrane. Journal of Membrane Science. Mar. 2009; 329:46-55.

Fang et al. Pore size control of ultrathin silicon membranes by rapid thermal carbonization. Nano Lett. 2010; 10:3904-3908.

(56) References Cited

OTHER PUBLICATIONS

Fischbein et al., Electron beam nanosculpting of suspended graphene sheets. Applied Physics Letters. 2008. 93: 113107.
Goel et al. Size analysis of single fullerene molecules by electron microscopy. J Carbon. 2004; 42:1907-1915.
Grantab et al., Anomalous strength characteristics of tilt grain boundaries in graphene. Science. 2010; 330(6006):946-48.
Han et al., Ultrathin graphene nanofiltration membrane for water purification. Advanced Functional Materials. Aug. 7, 2013; 23(29):3693-3700. doi:10.1002/ADFM.201202601.
Henis et al., Composite hollow fiber membranes for gas separation: the resistance model approach. Journal of Membrane Science. 1981. 8: 233-46.
Jiang et al., Porous Graphene as the Ultimate Membrane for Gas Separation, Nano Letters, vol. 9, No. 12, pp. 4019-4024 (Sep. 23, 2009).
Joung et al., Determination of alkali and halide monovalent ion parameters for use in explicitly solvated biomolecular simulations. J Phys Chem B, 2008, 112(30), pp. 9020-9041, doi: 10/1021/jp8001614. Epub Jul. 2, 2008.
Kemell et al. Transparent superhydrophobic surfaces by self-assembly of hydrophobic monolayers on nanostructured surfaces. Phys Stat Sol (a). 2006; 203:1453-1458.
Kholmanov et al., Improved electrical conductivity of graphene films integrated with metal nanowires. Nano Lett. Nov. 14, 2012;12(11):5679-83. doi: 10.1021/n1302870x.
Kim et al., Applications of atomic layer deposition to nanofabrication and emerging nanodevices. Thin Solid Films. 2009; 517:2563-2580.
Kim et al., Fabrication and Characterization of Large-Area, Semiconducting Nanoperforated Graphene Materials. Nano Letters. 2010. 10: 1125-31. DOI: 10.1021/n19032318.
Kim et al., Selective gas transport through few-layered graphene and graphene oxide membranes. Science. Oct. 4, 2013; 342:91-94.
Koenig et al., Selective Molecular Sieving Through Porous Graphene, Nature NanoTechnology, vol. 7, pp. 728-732 (Nov. 2012).
Lee et al. Measurement of the elastic properties and intrinsic strength of monolayer graphene. Science. 2008; 321(5887):385-88.
Lehtinen et al., Effects of Ion Bombardment on a Two-Dimensional Target: Atomistic Simulations of Graphene Irradiation, Physical Review B, vol. 81, pp. 153401.01-153401.04 (2010).
Lerf et al. Hydration behavior and dynamics of water molecules in graphite oxide. J Phys Chem Sol. 2006; 67:1106-1110.
Li et al., Ultrathin, molecular-sieving graphene oxide membranes for selective hydrogen separation. Science. Oct. 4, 2013; 342:95-98.
Liu et al., Two-Dimensional-Material Membranes: A New Family of High-Performance Separation Membranes. Angew Chem Int Ed Engl. Oct. 17, 2016;55(43):13384-13397. doi: 10.1002/anie.201600438. Epub Jul. 1, 2016.
Merchant et al., DNA translocation through graphene nanopores. Nano Lett. 2010;10(8):2915-21.
Min et al., Mechanical properties of graphene under shear deformation. Applied Physics Letters. 2011; 98(1).

Mooney et al. Simulation studies for liquid phenol: properties evaluated and tested over a range of temperatures. Chem Phys Lett. 1998; 294:135-142.
Muller-Plathe, Local structure and dynamics in solvent-swollen polymers. Macromolecules. 1996;29(13):4782-91.
Nyyssonen, Optical Linewidth measurement on patterned wafers. SPIE Proceedings, Integrated Circuit Metrology. 1984; 480:65.
O'Hern et al., Selective molecular transport through intrinsic defects in a single layer of CVD graphene. ACS Nano. Nov. 27, 2012;6(11):10130-8.
Oh et al., Design of pressure-driven microfluidic networks using electric circuit analogy. Lab Chip. Feb. 7, 2012;12(3):515-45. doi: 10.1039/c2lc20799k. Epub Dec. 16, 2011. Review.
Pendergast et al., A review of water treatment membrane nanotechnologies. Energy Environ Sci. 2011; 4:1946-1971.
Prabhu et al. SEM-induced shrinking of solid-state nanopores for single molecule detection. Nanotech. 2011; 22:425302-425311.
Russo et al., Atom-By-Atom Nucleation And Growth Of Graphene Nanopores, PNAS, vol. 109, No. 16, pp. 5953-5957 (Apr. 17, 2012).
Schrier, Carbon dioxide separation with a two-dimensional polymer membrane. ACS Appl Mater Interfaces. Jul. 25, 2012;4(7):3745-52.
Singh et al. Modification of regenerated cellulose ultrafiltration membranes by surface-initiated atom transfer radical polymerization. Journal of Membrane Science. 2008; 311:225-234.
Sint et al., Selective ion passage through functionalized graphene nanopores. J Am Chem Soc. Dec. 10, 2008;130(49):16448-9.
Storm et al. Fabrication of solid-state nanopores with single-nanometre precision. Nat Mater Lett. 2003; 2:537-540.
Suess et al., Abundances of the elements. Reviews of Modern Physics. 1956; 18:53-74.
Suk et al., Water Transport Through Ultrathin Graphene, J. Phys. Chem. Lett., vol. 1, pp. 1590-1594 (Apr. 30, 2010).
Sun et al., Selective ion penetration of graphene oxide membranes. ACS Nano. Jan. 22, 2013;7(1):428-37.
Taffa et al. Pore size and surface charge control in mesoporous $TiO_2$ using post-grafted SAMs. Phys Chem Chem Phys. 2010; 12:1473-1482.
Ulman, Formation and structure of self-assembled monolayers. Chem Rev. 1996; 96:1533-1554.
Van Den Haut et al. Controlling nanopore size, shape and stability. Nanotech. 2010; 21:115304-115309.
Venkatesan et al. Highly sensitive, mechanically stable nanopore sensors for DNA analysis. Adv Mater. Jul. 2009 ;21(27):2771-6. Author Manuscript, 14 pages.
Yoon et al., Graphene-based membranes: status and prospects. Philos Trans A Math Phys Eng Sci. Feb. 13, 2016;374(2060). pii: 20150024. doi: 10.1098/rsta.2015.0024.
Zhu et al. Surface modification of PVDF porous membranes via poly(DOPA) coating and heparin immobilization. Colloids Surf B Biointerfaces. Feb. 15, 2009;69(1):152-5. doi: 10.1016/j.colsurfb.2008.11.011. Epub Nov. 25, 2008.
PCT/US2019/039937, Jan. 7, 2021, International Preliminary Report on Patentability.
International Preliminary Report on Patentability for Application No. PCT/US2019/039937, mailed Jan. 7, 2021.

* cited by examiner

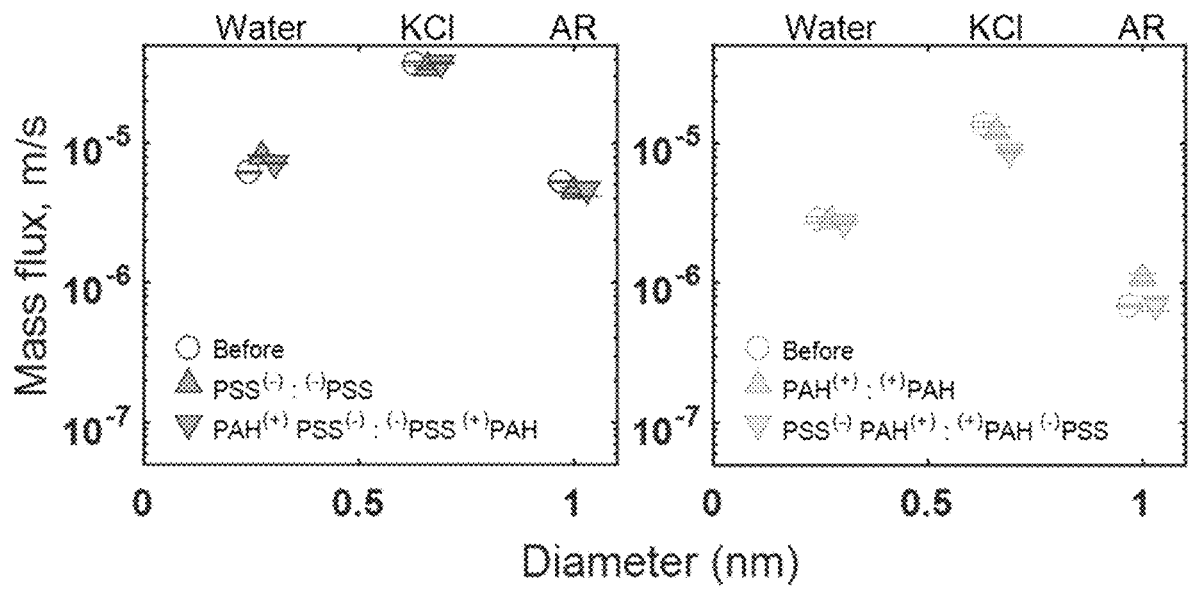
*FIG. 8A*            *FIG. 8B*
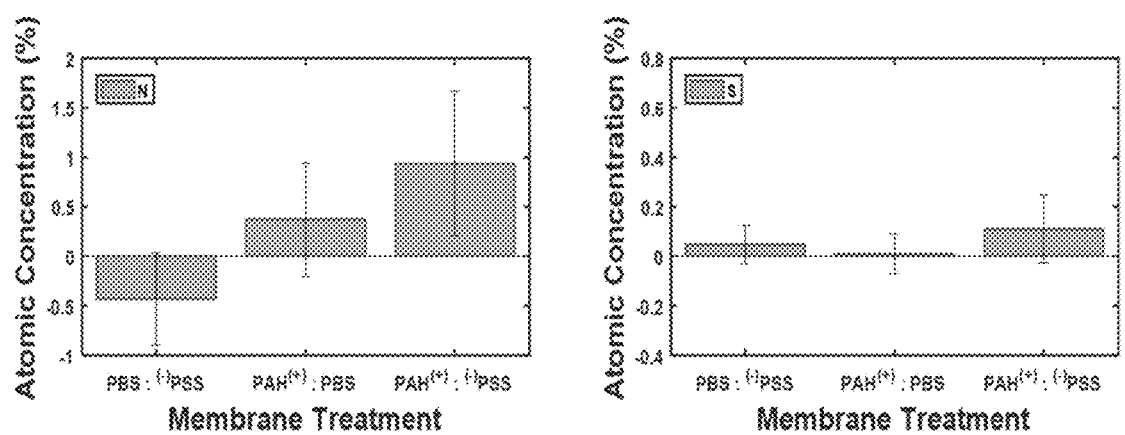
*FIG. 9A*            *FIG. 9B*

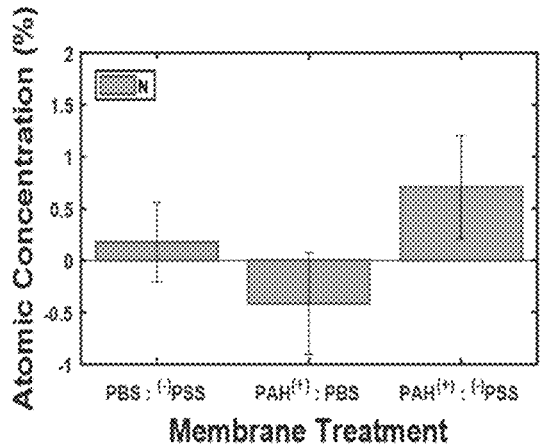
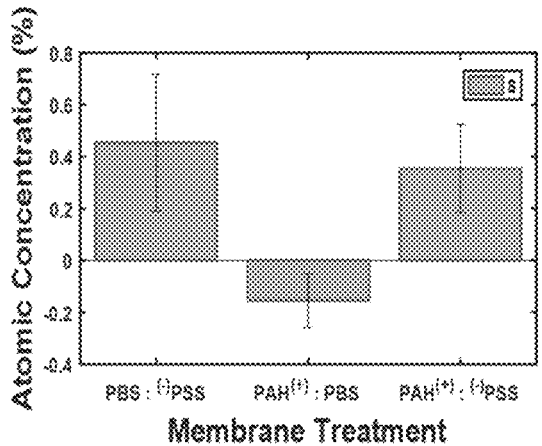
*FIG. 10A*  *FIG. 10B*
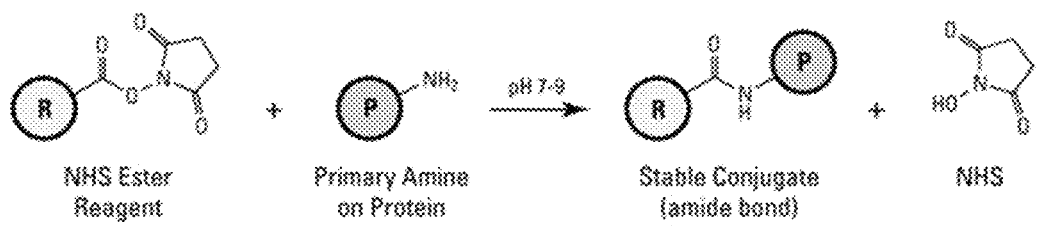
*FIG. 11A*
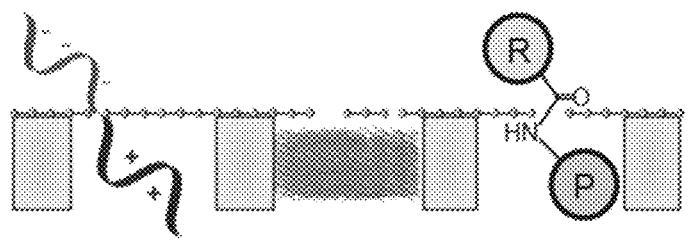
*FIG. 11B*

COATINGS TO IMPROVE THE SELECTIVITY OF ATOMICALLY THIN MEMBRANES

RELATED APPLICATIONS

This application claims priority under 35 U.S.C. § 119(e) to U.S. Provisional Application No. 62/691,479, filed Jun. 28, 2018, and entitled "Coatings to Improve Selectivity of Atomically Thin Membranes," which is incorporated herein by reference in its entirety for all purposes.

TECHNICAL FIELD

Disclosed embodiments are related to mitigating leaks in membranes and/or improving the selectivity of membranes.

BACKGROUND

Many industries and applications, such as water purification, chemical synthesis, pharmaceutical purification, refining, and/or natural gas separation, rely on energy-intensive membrane separation as a major component of the respective processes. The need for membranes with high selectivity and flux for both liquid-phase and gas-phase membranes has led to improvements in ceramic and polymer-based membranes over the past few decades. One of the primary challenges has been maximizing flux while maintaining high selectivity. Typically, increasing flux rate necessitates a decrease in selectivity. Although recent advancements have resulted in the development of polymeric and ceramic membranes, further improvements in membrane technology will likely rely on new membrane materials that provide better transport properties and reduced energy consumption. Two-dimensional (2D) materials, such as graphene, have opened new opportunities to advance membrane technology, as the materials can form an active layer that confers selectivity and minimizes transport loss.

SUMMARY

Disclosed embodiments are related to mitigating leaks in membranes and/or improving the selectivity of membranes.

In some embodiments, a membrane is described, the membrane comprising a substrate, an active layer comprising a first surface, a second surface, and a plurality of channels passing through the active layer, wherein the first surface is directly opposite the second surface and the active layer is disposed on the substrate, a first material at least partially in contact with the first surface, and a second material at least partially in contact with the second surface, wherein the first material and the second material are configured such that there is at least one interaction between the first material and the second material through at least one channel, thus affecting the through-size of the at least one channel.

According to certain embodiments, a method of coating an active layer is described, the method comprising providing an active layer comprising a first surface, a second surface, and a plurality of channels passing through the active layer, wherein the first surface is directly opposite the second surface, applying a first material to at least a portion of the first surface, and applying a second material to at least a portion of the second surface such that there is at least one interaction between the first material and the second material through at least one channel passing through the active layer.

It should be appreciated that the foregoing concepts, and additional concepts discussed below, may be arranged in any suitable combination, as the present disclosure is not limited in this respect. Additionally, the foregoing and other aspects, embodiments, and features of the present teachings can be more fully understood from the following description in conjunction with the accompanying drawings.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 8A shows transport measurements of water, KCl, and Allura Red before and after a control treatment of PSS only, followed by a control treatment of PAH on both sides of the active layer;

FIG. 8B shows transport measurements of water, KCl, Allura Red before and after a control treatment of PAH only, followed by a control treatment of PSS on both sides of the active layer;

FIG. 9A shows atomic concentrations of nitrogen in polyelectrolytes coating an active layer calculated from XPS measurements;

FIG. 9B shows atomic concentrations of sulfur in polyelectrolytes coating an active layer calculated from XPS measurements;

FIG. 10A shows atomic concentrations of nitrogen in polyelectrolytes coating an active layer without pore creation calculated from XPS measurements;

FIG. 10B shows atomic concentrations of sulfur in polyelectrolytes coating an active layer without pore creation calculated from XPS measurements;

FIG. 11A is a schematic representation of NHS ester conjugation to a primary amine;

FIG. 11B is a schematic representation of a covalent assembly of PEG-NHS and PEI across an active layer;

DETAILED DESCRIPTION

Figure 1A:
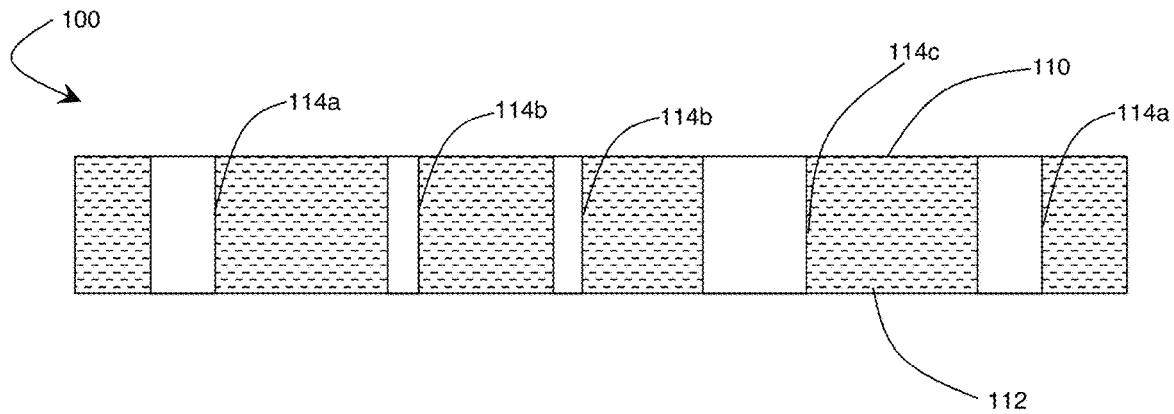
FIG. 1A is, according to certain embodiments, a cross-sectional schematic diagram of an active layer.

Disclosed embodiments are related to mitigating leaks in membranes and/or improving the selectivity of membranes. The inventors have realized that two-dimensional (2D) atomically thin materials including a single, or in some instances several, atomic layers, have immense potential as a highly-permeable, highly-selective filtration membranes. Due to the ability to create angstrom and nanometer scale pores in a single sheet, 2D materials may effectively and efficiently permit selective transport of molecules for filtration in liquid and gas separation processes. Additionally, and without wishing to be bound by theory, the ultrathin thicknesses associated with these materials may permit extremely high permeance and corresponding flow rates while maintaining better selectivity as compared to, for example, less-organized membranes.

In addition to the benefits associated with using atomically thin membranes, the inventors have also recognized that one of the primary challenges facing their development for use in filtration applications is the presence of intrinsic and extrinsic defects that are introduced during manufacturing of the material or during transferring processes of these materials onto porous support substrates. These defects may exist as channels, pores, holes, and/or cracks through the active layer, and typically exhibit a broad size distribution which can range from about 0.1 nm up to several nanometers, or even from micrometers to millimeters. In certain cases, these defects allow free transport of ions, solutes, and gases. Further, unlike membranes of finite thickness, atomically thin materials are more susceptible to leakage through these defects and will correspondingly exhibit decreased net selectivity when these types of defects are present.

In view of the above, the inventors have recognized that it may be desirable to reduce, or eliminate, leakage through the noted defects. Consequently, the inventors have recognized the benefits associated with applying a coating onto opposite sides of an atomically thin active layer in order to increase the selectivity of the active layer by preferentially affecting the through-size of certain channels of the active layer, thereby reducing flow through the nonselective leakage pathways. The coating may include molecules, polymers, gels, particles, colloids and/or other materials. In certain embodiments, the through-size of a channel may be affected due to an interaction between a first material coating one side of the active layer and a second material coating the opposite side of the active layer, wherein the interaction between the first material and the second material is through at least one channel of the active layer. The active layer may be coated with the materials during the manufacturing process (e.g., before and/or after creation of selective pores in the active layer) and/or during a repair after the active layer has already been in service (e.g., as a filtration membrane).

Without wishing to be bound by theory, the disclosed membranes methods of mitigating leaks through certain channels in the active layer may help to enable the production of highly selective membranes using a single atomically thin active layer without the need to stack multiple atomically thin layers together to reduce leakage pathways. However, it should be understood that these methods may also be used with membranes including multiple layers of atomically thin active layers. The disclosed membranes and methods may help to enable the use of atomically thin layers as molecular sieves for gas-phase or liquid-phase separation processes by reducing or eliminating the permeance of non-selective, uncontrolled channels through mechanisms such affecting the through-size of the channels by blocking, clogging, and/or plugging the channels and/or minimizing their impact on membrane transport properties.

In certain aspects, a membrane is described. The membrane may comprise a substrate and an active layer (e.g., an atomically thin active layer) disposed on the substrate. In some embodiments, the membrane is a filtration membrane.

For the sake of clarity, the embodiments and examples described herein are primarily directed to the use of an active layer comprising graphene. However, the active layers and membranes described herein are not so limited. For example, in certain embodiments, the active layer may comprise hexagonal boron nitride, molybdenum disulfide, vanadium pentoxide, silicon, doped-graphene, graphene oxide, hydrogenated graphene, fluorinated graphene, a covalent organic framework, a metal-organic framework, a layered transition metal dichalcogenide (e.g., titanium disulfide, nickel(II) oxide, etc.), layered Group-IV and Group-III metal chalcogenides (eg. SnS, PbS, GeS, etc.), silicene, germanene, and layered binary compounds of Group IV elements and Group III-V elements (e.g. SiC, GeC, SiGe), and/or any other appropriate atomically thin material. Additionally, in some embodiments the methods described herein may be applied to the production of thicker non-atomically thin membrane materials such as graphene containing multiple atomic layers, graphene oxide containing multiple atomic layers, thin-layer atomic layer deposition of metal oxides ($AlO_2$, $HfO_2$, etc.), zeolites, and other appropriate materials as well.

In certain embodiments, the active layer is an atomically thin active layer. While the embodiments described herein are directed to atomically thin active layers, the disclosed methods could also be applied to membranes with finite thickness as well.

The active layer may be formed using any appropriate technique. The active layer may additionally be transferred and subsequently bonded to an appropriate substrate (e.g., a porous substrate) using any appropriate transfer technique, which are explained in further detail herein.

Figure 1B:
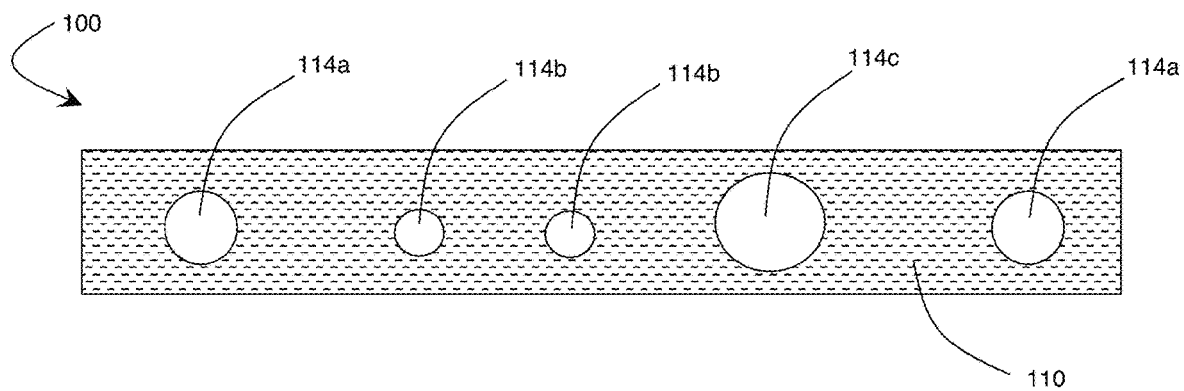
FIG. 1B is, according to some embodiments, a top-view schematic diagram of an active layer.
Figure 1C:
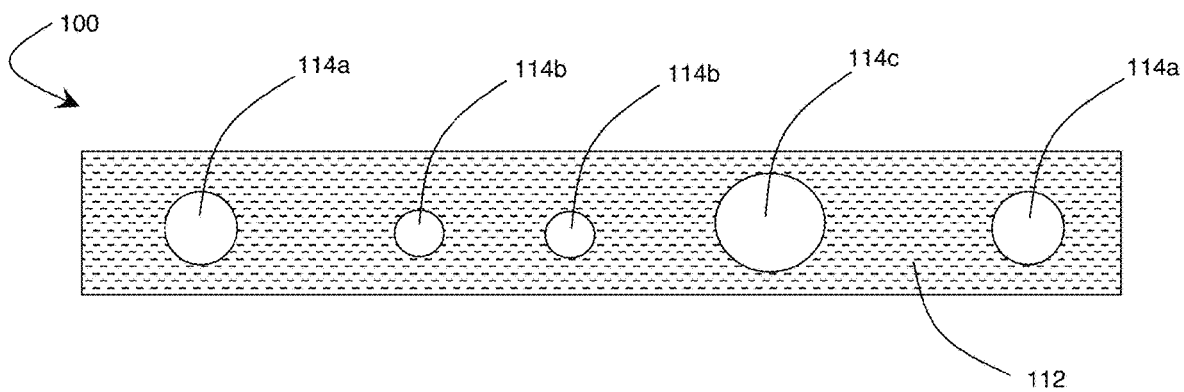
FIG. 1C is, according to some embodiments, a bottom-view schematic diagram of an active layer.

In certain embodiments, the active layer comprises a first surface and a second surface. FIG. 1A is, according to certain embodiments, a cross-sectional diagram of an active layer. As shown in FIG. 1A, active layer 100 comprises first surface 110 and second surface 112. In addition, FIG. 1B is, according to some embodiments, a top-view diagram of an active layer, and FIG. 1C is, according to some embodiments, a bottom-view diagram of an active layer. As shown in FIG. 1B, active layer 100 comprises first surface 110, and as shown in FIG. 1C, active layer 100 comprises second surface 112. According to some embodiments, the first surface of the active layer is directly opposite the second surface of the active layer. As shown in FIG. 1A, for example, first surface 110 of active layer 100 is directly opposite second surface 112 of active layer 110.

In some embodiments, the active layer comprises a plurality of channels passing through the active layer. Depending on the embodiment, the plurality of channels may comprise sub-nanochannels, nanochannels, or microchannels. As used herein, the term "channel" corresponds to a passage from the first surface of the active layer to the second surface of the active layer. In certain embodiments, the plurality of channels may comprise pores, defects, cracks, holes, and/or the like that pass through the active layer.

Referring to FIG. 1A, active layer 100 comprises a plurality of channels 114 (e.g., 114a, 114b, and 114c) passing through active layer 100. In certain aspects, the plurality of channels may pass through the active layer such that the plurality of channels extend from the first surface through the active layer to the second surface. For example, as shown in FIG. 1A, active layer 100 comprises plurality of channels 114 that extend from first surface 110 through active layer 100 to second surface 112.

Figure 2:
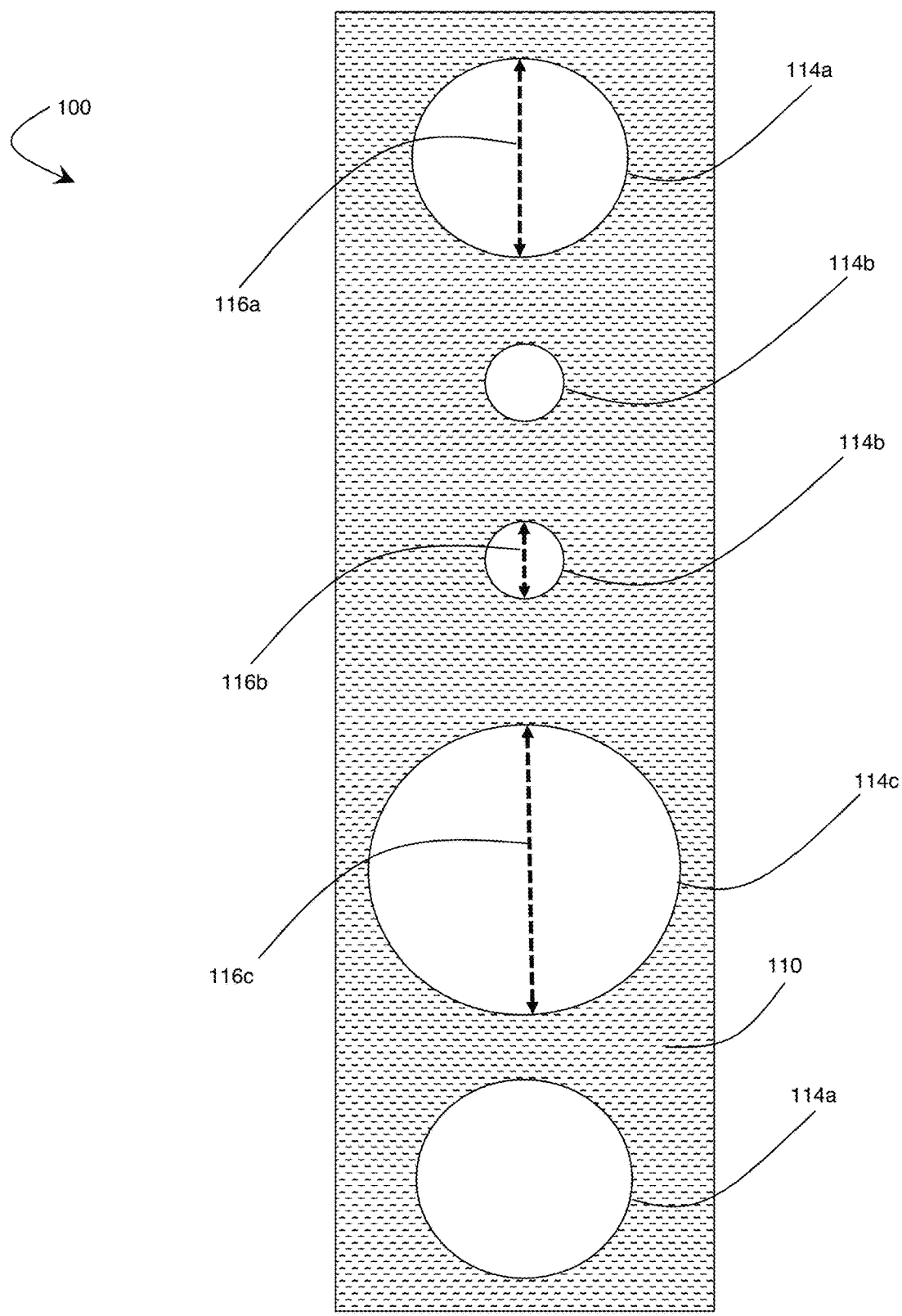
FIG. 2 is, according to certain embodiments, an top-view schematic diagram of an active layer comprising a plurality channels.

For the sake of clarity, the embodiments and examples described herein are primarily directed to tubular (e.g., circular) channels that pass through the active layer. For example, FIG. 2 is, according to certain embodiments, an additional top-view diagram of an active layer comprising a plurality channels. Referring to FIG. 2, active layer 100 may comprise plurality of channels 114 that have tubular (e.g., circular) shape. However, without wishing to bound by theory, the shape and size of the channels passing through the active layer as described herein are not so limited. For example, in certain embodiments, the plurality of channels may have a triangular, square, or any other appropriate shape. Additionally, the plurality of channels may be in the shape of a crack, a tear, a break, or a similar defect in the active layer.

In certain aspects, the plurality of channels may be formed in the active layer either prior to, or after, transferring the active layer to a substrate. Several options exist for precisely controlling the size of channels created in the active layer. These include, but are not limited to, ion bombardment, chemical etching, gas cluster ion-beam bombardment, pulsed laser deposition, plasma treatment, UV-ozone treatment, and growing graphene on copper with patterned channels. Once the channels in the active layer are generated, their sizes and shapes can be further refined through chemical etching. Additionally, intrinsic channels (e.g., defects, pores, etc.) in the synthesized active layer can also be used for filtration. These channels may occur naturally in the chemical vapor deposition (CVD) of the active layer, or may be introduced during synthesis of the active layer by controlling the substrates on which the active layer is grown. For example, in a non-limiting embodiment, a substrate (e.g., copper substrate) for growing an active layer (e.g., graphene) may be patterned, alloyed, or coated with nanoparticles to facilitate the introduction of channels of a desired size into the active layer during growth. Additionally, gases such as ammonia or nitrogen may be added during synthesis to create pores during the CVD process. Furthermore, the amorphous regions in the active layer may contain a higher number of channels, which can also be used for filtration. Regardless of the manner in which the channels are created, after forming the channels in the one or more active layers, the channels may be selectively etched to a preselected size. Examples of appropriate etchants for these materials include, but are not limited to, concentrated nitric acid, mixtures of potassium permanganate and sulfuric acid, hydrogen plasmas, and hydrogen peroxide.

Additionally, in some embodiments, the channels are optionally functionalized to enhance a desired characteristic of the resulting membrane. In some embodiments, for example, the channels present in the active layer may be functionalized to enhance the selectivity of the composite membrane. For example, the channels might be functionalized such that they are hydrophobic and/or hydrophilic depending on the desired application. Specific forms of functionalization may include, but are not limited to, carboxyl groups, hydroxyl groups, amine groups, polymer chains (polyamide, polyethyleneglycol, polyamide, etc), small molecules, chelating agents, macrocycles, and biomolecules (e.g. crown ethers, porphyrins, calixarenes, deferasirox, pentetic acid, deferoxamine, DNA, enzymes, antibodies, etc.). In some embodiments, the above noted functionalizations, as well as other appropriate functionalizations, may be used to modulate transport of a molecule or particle through the active layer. For example, and without wishing to be bound by theory: 15-crown-5 preferentially binds sodium ions and may thus regulate its transport, or, it may regulate the transport of other ions or molecules in response to binding of a sodium ion; polyethyleneglycol may preferentially allow transport of only small hydrophilic molecules and ions; and polyamide may allow for the preferential transport of water. In alternative embodiments, only the channels may be selectively functionalized. For example, the channels can have different chemical groups depending on the method of pore creation and treatment due to the pores oftentimes being more reactive than the surface of the active layer. These differences can be used to selectively functionalize only the channels. Thus, embodiments in which the surface and/or channels of the active layer are functionalized are possible.

Each channel of the plurality of channels may have a particular through-size. In some embodiments, the through-size of the channel is a maximum dimension of the channel. For example, in certain embodiments, the through-size of the channel is a diameter of the channel. Referring to FIG. 2, active layer 100 may comprise plurality of channels 114 (e.g., 114a, 114b, 114c), wherein each channel has through-size 116 (e.g., 116a, 116b, 116c). Furthermore, as shown in FIG. 2, in some embodiments, through-size 116 is the maximum dimension (e.g., diameter) of each channel of plurality of channels 114.

In certain embodiments, each channel of the plurality of channels may have the same, essentially the same, and/or different through-sizes. In certain embodiments, the distribution of the through-size of the plurality of channels varies, for example, from sub-nanometers to micrometers. As shown in FIG. 2, in a non-limiting embodiments, active layer 100 comprises plurality of channels 114 with various through-sizes (e.g., channel 114a has first through-size 116a, channel 114b has second through-size 116b that is smaller than first through-size 116a, and channel 114c has third through-size 116c that is larger than first through-size 116a). Other combinations and distributions of channel through-sizes are possible.

Each channel of the plurality of the channels may have any of a variety of through-sizes. For example, in some aspects, each channel of the plurality of channels has a through-size of greater than or equal to 0.1 nm, greater than or equal to 0.2 nm, greater than or equal to 0.5 nm, greater than or equal to 1 nm, greater than or equal to 2 nm, greater than or equal to 3 nm, greater than or equal to 4 nm, greater than or equal to 5 nm, greater than or equal to 6 nm, greater than or equal to 7 nm, greater than or equal to 8 nm, greater than or equal to 9 nm, greater than or equal to 10 nm, greater than or equal to 20 nm, greater than or equal to 50 nm, greater than or equal to 100 nm, greater than or equal to 200 nm, or greater than or equal to 500 nm. In certain embodiments, each channel of the plurality of channels has a through-size of less than or equal to 1 micrometer, less than or equal to 500 nm, less than or equal to 200 nm, less than or equal to 100 nm, less than or equal to 50 nm, less than or equal to 20 nm, less than or equal to 10 nm, less than or equal to 9 nm, less than or equal to 8 nm, less than or equal to 7 nm, less than or equal to 6 nm, less than or equal to 5 nm, less than or equal to 4 nm, less than or equal to 3 nm, less than or equal to 2 nm, less than or equal to 1 nm, less than or equal to 0.5 nm, or less than or equal to 0.2 nm. Combinations of the above recited ranges are also possible (e.g., each channel of the plurality of channels has a through-size of greater than or equal to 0.1 nm and less than or equal to 1 micrometer, each channel of the plurality of channels has a through-size of greater than or equal to 5 nm and less than or equal to 50 nm). Other combinations are also possible.

Figure 3:
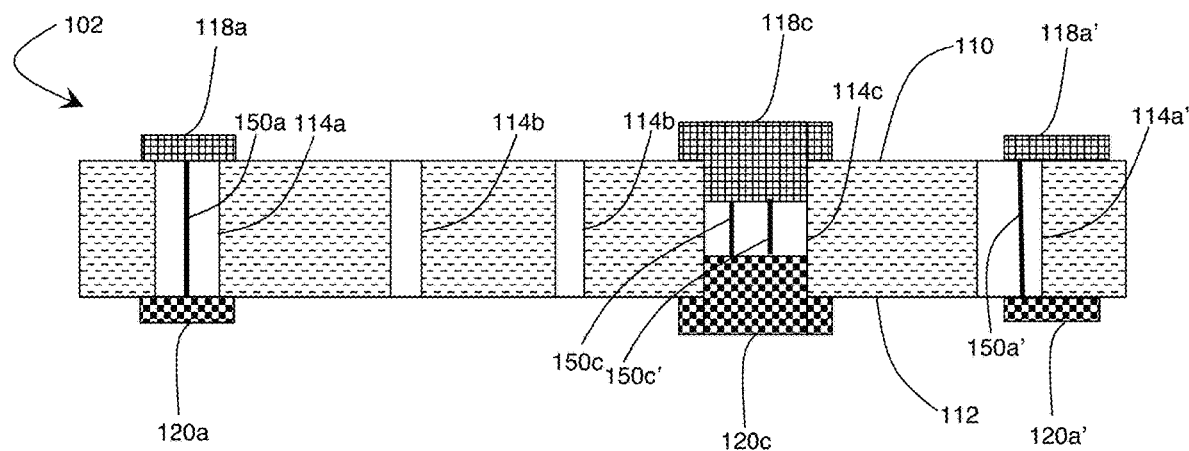
FIG. 3 is, according to some embodiments, a cross-sectional schematic diagram of an active layer comprising a plurality of channels, a first material at least partially in contact with a first surface, and a second material at least partially in contact with a second surface.

According to some embodiments, the active layer comprises a first material at least partially in contact with the first surface of the active layer and a second material at least partially in contact with the second surface of the active layer. In certain embodiments, the first material and/or the second material comprises a molecule, a polymer, a gel, a particle, and/or a colloid. In some aspects, the first material and/or the second material may comprise a nucleic acid (e.g., DNA, RNA), oligonucleotides, peptides, and/or proteins. FIG. 3 is, according to some embodiments, a cross-sectional diagram of an active layer comprising a plurality of channels passing through the active layer, a first material at least partially in contact with a first surface, and a second material at least partially in contact with a second surface. As shown in FIG. 3, active layer 102 may comprise first surface 110, second surface 112, and plurality of channels 114 (e.g., 114a, 114a', 114b, and 114c). In some embodiments, active layer 102 comprises first material 118 (e.g., 118a, 118a', and 118c) at least partially in contact with first surface 110, and second material 120 (e.g., 120a, 120a', and 120c) at least partially in contact with second surface 112. First material 118 and second material 120 may comprise a molecule, a polymer, a gel, a particle, and/or a colloid. Specific, non-limiting compositions of the first material and the second material are explained in further detail below.

In certain embodiments, the first material and/or the second material may extend entirely across at least one channel at the first surface and/or the second surface of the active layer, respectively. For example, as shown in FIG. 3, first material 118a and second material 120a extend entirely across channel 114a, and first material 118c and second material 120c extend entirely across channel 114c. In some other embodiments, the first material and/or the second material may only partially extend across at least one channel at the first surface and/or the second surface of the active layer, respectively. For example, referring again to FIG. 3, first material 118a' and second material 120a' only partially extend across channel 114a'. In certain embodiments, whether or not the first material and/or the second material extends entirely across at least one channel at the first surface and/or the second surface of the active layer, respectively, depends on the through-size of the channel and/or the composition of the first material and/or the second material.

According to certain embodiments, the first material and the second material are configured such that there is at least one interaction between the first material and the second material through at least one channel. For example, referring to FIG. 3, first material 118 (e.g., 118a, 118a', and 118c) and second material 120 (e.g., 120a, 120a', and 120c) are configured such that there is interaction 150 (e.g., 150a, 150a', 150c, and 150c') between first material 118 and second material 120 through channels 114a, 114a', and 114c. In some embodiments, the interaction between the first material and the second material through the channel affects the through-size of the particular channel. For example, referring again to FIG. 3, interaction 150 (e.g., 150a, 150a', 150c, and 150c') between first material 118 (e.g., 118a, 118a', and 118c) and second material 120 (e.g., 120a, 120a', and 120c) may affect the through-size of channels 114a, 114a', and 114c. In certain embodiments, there may be more than one interaction between the first material and the second material through a channel. For example, as shown in FIG. 3, first material 118c and second material 120c are configured such that there are two interactions 150c and 150c' through channel 114c.

The interaction between the first material and the second material may affect any of a variety of channel through-sizes (e.g., diameters). For example, in some embodiments, the interaction between the first material and the second material may affect the through-size of a channel with a through-size of greater than or equal to 0.1 nm, greater than or equal to 0.2 nm, greater than or equal to 0.5 nm, greater than or equal to 1 nm, greater than or equal to 2 nm, greater than or equal to 3 nm, greater than or equal to 4 nm, greater than or equal to 5 nm, greater than or equal to 6 nm, greater than or equal to 7 nm, greater than or equal to 8 nm, greater than or equal to 9 nm, greater than or equal to 10 nm, greater than or equal to 20 nm, greater than or equal to 50 nm, greater than or equal to 100 nm, greater than or equal to 200 nm, or greater than or equal to 500 nm. In some embodiments, the interaction between the first material and the second material may affect the through-size of a channel with a through-size of less than or equal to 1 micrometer, less than or equal to 500 nm, less than or equal to 200 nm, less than or equal to 100 nm, less than or equal to 50 nm, less than or equal to 20 nm, less than or equal to 10 nm, less than or equal to 9 nm, less than or equal to 8 nm, less than or equal to 7 nm, less than or equal to 6 nm, less than or equal to 5 nm, less than or equal to 4 nm, less than or equal to 3 nm, less than or equal to 2 nm, less than or equal to 1 nm, less than or equal to 0.5 nm, or less than or equal to 0.2 nm. Combinations of the above recited ranges are also possible (e.g., the interaction between the first material and the second material may affect the through-size of a channel with a through-size of greater than or equal to 0.1 nm and less than or equal to 1 micrometer nm, the interaction between the first material and the second material may affect the through-size of a channel with a through-size of greater than or equal to 5 nm and less than or equal to 50 nm). Other combinations are also possible.

According to certain embodiments, the interaction between the first material and the second material may affect the distribution of channel through-sizes as compared to an active layer that is otherwise equivalent but does not have an interaction between a first material and a second material affecting the through-size of one or more channels of the active layer. For example, in certain embodiments, the distribution of channel through-sizes varies, for example, from sub-nanometers to nanometers due to the interaction between the first material and the second material. Without wishing to be bound by theory, a narrower channel through-size distribution results in better membrane selectively and performance, as compared to a broader channel size distribution.

In certain embodiments, the interaction between the first material and the second material may be used to completely seal one or more channels (e.g., nanometer sized channels), while leaving other channels (e.g., sub-nanometer channels) unsealed. For example, referring to FIG. 3, interaction 150a, 150c, and 150c' between first material 118a and 118c and second material 120a and 120c may completely seal channels 114a and 114c. Alternatively, as shown in FIG. 3, interaction 150a' between first material 118a' and second material 120a' may not completely seal channel 114a'. In certain embodiments, the sealing of channels may be beneficial since most nanofiltration and reverse osmosis processes require channels that are in the sub-nanometer to several nanometer size scale and the above-noted interaction between the first material and the second material may be used to seal the nonselective defects while leaving the desired selective pores unsealed.

According to some aspects, a species (e.g. a molecule, a polymer, a gel, a particle, a colloid, etc.) of the first material and/or a species of the second material may span more than one channel, such that there may be at least two interactions between a species of the first material and a species of the second material through at least two channels passing through the active layer, thus affecting the through-size of each of the at least two channels.

In certain embodiments, as a result of the interaction between the first material and the second material affecting the through-size of one or more channels of the active layer, the selectivity of the active layer towards one or more solute species will be improved. For example, in certain embodiments, the selectivity of the active layer towards monovalent salts (e.g., KCl, NaCl, etc.), divalent salts (e.g., $MgSO_4$), organic compounds (e.g. organic azo dyes such as Allura Red AC), gases (e.g., $CO_2$, $N_2$) may be improved, as compared to an active layer that is otherwise equivalent but does not have an interaction between a first material and a second material affecting the through-size of one or more channels of the active layer. Furthermore, in certain embodiments, the selectivity of the active layer towards certain species (e.g., monovalent salts, divalent salts, organic azo dyes) may be improved without significantly comprising the permeance to water.

The concept of forming an interaction between a first material and a second material to affect the through-size of a channel in the active layer may be implemented using any of a variety of different types of interactions and/or reactions between the first material and the second material, including, but not limited to, ionic (e.g., electrostatic) interactions and/or the formation of a covalent bond, which is explained in further detail below. In certain embodiments, the interaction between the first material and the second material may be initiated by one or more reaction conditions, including, but not limited to, pH and/or the presence of light.

In certain embodiments, the first material and/or the second material comprises a polyelectrolyte. In some aspects, the first material comprises a polyelectrolyte that is positively charged. For example, referring to FIG. 3, in some embodiments, first material 118 (e.g., 118a, 118a', and 118c) may comprise a positively charged polyelectrolyte. The positively charged polyelectrolyte may be, for example, polyallylamine, polyethylenimine, poly(diallyldimethylammonium), and/or poly(methacryloyloxyethyl trimethylammonium chloride). Other positively charged polyelectrolytes may also be utilized.

In some embodiments, the second material comprises a polyelectrolyte that is negatively charged. For example, referring to FIG. 3, in certain embodiments, second material 120 (e.g., 120a, 120a', and 120c) may comprise a negatively charged polyelectrolyte. The negatively charged polyelectrolyte may be, for example, polystyrene sulfonate and/or polyacrylic acid. Other negatively charged polyelectrolytes may also be utilized.

In certain embodiments, the interaction between the first material and the second material is a non-covalent interaction. For example, in some aspects, the non-covalent interaction is an ionic bond, an electrostatic interaction, a hydrophobic interaction, a solvation interaction, and/or a van der Waals interaction. In some non-limiting embodiments wherein polyelectrolytes are utilized as the first material and the second material, at least one interaction between the first material and the second material is a non-covalent interaction. For example, in some embodiments, the non-covalent interaction between the first material comprising a positively charged polyelectrolyte and the second material comprising a negatively charged polyelectrolyte is an ionic bond and/or an electrostatic interaction between the oppositely charged species. In certain aspects, it may be advantageous to employ a first material (e.g., a positively charged polyelectrolyte) and a second material (e.g., a negatively charged polyelectrolyte) that form at least one non-covalent (e.g., ionic, electrostatic) interaction, as the non-covalent interaction between the first material and the second material may occur at a kinetically fast rate, thereby facilitating a rapid coating on the active layer.

In certain embodiments, the first material and/or the second material comprises a polymer, copolymer, oligomer, and/or macromer that are capable of crosslinking with one another. As used herein, the term "crosslink" refers to a chemical reaction between two or more similar or dissimilar polymers, copolymers, oligomers, and/or macromers that links the two or more similar or dissimilar polymers, copolymers, oligomers, or macromers via formation of at least one covalent bond and/or ionic bond, or a chain extension between one or more polymers, copolymers, oligomers, and/or macromers to provide a longer chain of the one or more polymers, copolymers, oligomers, and/or macromers via formation of at least one covalent bond and/or ionic bond.

In certain embodiments, the first material comprises an electrophilic component (e.g., an electrophilic polymer). In some embodiments, the first material may comprise a N-hydroxysuccinimide ester-containing compound. Referring to FIG. 3, in some embodiments, first material 118 (e.g., 118a, 118a', and 118c) may comprise a N-hydroxysuccinimide ester-containing compound. The N-hydroxysuccinimide ester-containing compound may be, for example, polyethylene glycol N-hydroxysuccinimide. Other N-hydroxysuccinimide ester-containing compounds may also be utilized.

According to certain embodiments, the second material comprises a nucleophilic component (e.g., a nucleophilic polymer) that is capable of reacting (e.g., crosslinking) with the first material comprising an electrophilic component (e.g., electrophilic polymer). In certain embodiments, for example, the second material comprises an amine-containing compound. Referring to FIG. 3, in some embodiments, second material 120 (e.g., 120a, 120a', and 120c) may comprise an amine-containing compound. In some embodiments, the amine-containing compound may be polyethylenimine. Other amine-containing compounds may also be utilized.

In some embodiments, the interaction between the first material and the second material is a covalent interaction. For example, in certain aspects, the interaction between the first material and the second material is the formation of a covalent bond between the first material and the second material. In some non-limiting embodiments wherein an electrophilic component (e.g., an electrophilic polymer) and a nucleophilic component (e.g., a nucleophilic polymer) are utilized as the first material and the second material, respectively, at least one interaction between the first material and the second material is one or more covalent bonds as a result of the electrophilic component and the nucleophilic component crosslinking with each other. For example, in certain aspects, the covalent interaction between the first material comprising an electrophilic component (e.g., an electrophilic polymer) and the second material comprising a nucleophilic component (e.g., a nucleophilic polymer) is the formation of an amide bond between the electrophilic component (e.g., the N-hydroxysuccinimide ester) and the nucleophilic component (e.g., the amine).

According to certain embodiments, it may be particularly advantageous to employ a first material and a second material that form at least two interactions through at least one channel in the active layer, wherein the at least two interactions are non-covalent interactions and/or covalent interactions. In certain non-limiting embodiments, the at least two interactions between the first material and the second material may be formed by a rapid assembly of the first material and the second material on opposite sides of the active layer due to the formation of a non-covalent interaction, followed by the formation of a covalent interaction between the first material and the second material due to the materials being in close proximity to each other as a result of the formation of the non-covalent interaction.

In certain embodiments, it may be particularly advantageous to employ a first material and/or a second material (e.g., a polyelectrolyte, a polymer, etc.) with predetermined sizes (e.g., average molecular weights). Without wishing to be bound by theory, utilizing a first material and a second material with predetermined average molecular weights may lead to the through-size of only certain channels (e.g., only nanometer sized channels) being affected by the interaction between the first material and the second material, while leaving other channels (e.g., sub-nanometer sized channels) unaffected. Thus, the through-size of channels that are affected by an interaction between a first material and as second material may be controlled by choosing reactants (e.g., a first material and a second material) of a certain size (e.g., certain average molecular weight). Referring to FIG. 3, for example, in a non-limiting embodiment, first material 118a may have a first average molecular weight, and first material 118c may have a second average molecular weight that is different (e.g., greater) than the first average molecular weight of first material 118a. Resultantly, in certain embodiments, first material 118a with a first average molecular weight may be employed to affect the through-size of channel 114a, and first material 118c with a second average molecular weight that is different than the first average molecular weight may be employed to affect the through-size of channel 114c. In addition, in some embodiments, first material 118a may have a first average molecular weight and first material 118c may have a second average molecular weight that are too large to affect the through-size of channel 114b. Furthermore, in some embodiments, utilizing a first material and/or a second material with a high molecular weight prevents the diffusion of each material to the opposite sides of the membrane. Due to the ability to choose the reactants to affect the through-size of channels greater than a particular size, the interaction between the first material and the second material may be utilized during manufacture and/or usage of a membrane to seal channels larger than a size corresponding to the particular reactants being used.

The first material (e.g., a positively charged polyelectrolyte) may have any of a variety of suitable average molecular weights. For example, in some embodiments, the first material (e.g., positively charged polyelectrolyte) has an average molecular weight of greater than or equal to 1,000 Da, greater than or equal to 50,000 Da, greater than or equal to 100,000 Da, greater than or equal to 150,000 Da, greater than or equal to 200,000 Da, greater than or equal to 250,000 Da, greater than or equal to 300,000 Da, greater than or equal to 350,000 Da, greater than or equal to 400,000 Da, or greater than or equal to 450,000 Da. In certain aspects, the first material has an average molecular weight of less than or equal to 500,000 Da, less than or equal to 450,000 Da, less than or equal to 400,000 Da, less than or equal to 350,000 Da, less than or equal to 300,000 Da, less than or equal to 250,000 Da, less than or equal to 200,000 Da, less than or equal to 150,000 Da, less than or equal to 100,000 Da, or less than or equal to 50,000 Da. Combinations of the above-recited ranges are also possible (e.g., the first material has an average molecular weight of greater than or equal to 1,000 Da and less than or equal to 500,000 Da, the first material has an average molecular weight of greater than or equal to 100,000 Da and less than or equal to 300,000 Da). Other combinations of average molecular weights for the first material (e.g., positively charged polyelectrolyte) are also possible.

The second material (e.g., a negatively charged polyelectrolyte) may have any of a variety of suitable average molecular weights. For example, in some embodiments, the second material (e.g., negatively charged polyelectrolyte) has an average molecular weight of greater than or equal to 1,000 Da, greater than or equal to 50,000 Da, greater than or equal to 100,000 Da, greater than or equal to 150,000 Da, greater than or equal to 200,000 Da, greater than or equal to 250,000 Da, greater than or equal to 300,000 Da, greater than or equal to 350,000 Da, greater than or equal to 400,000 Da, or greater than or equal to 450,000 Da. In certain aspects, the second material has an average molecular weight of less than or equal to 500,000 Da, less than or equal to 450,000 Da, less than or equal to 400,000 Da, less than or equal to 350,000 Da, less than or equal to 300,000 Da, less than or equal to 250,000 Da, less than or equal to 200,000 Da, less than or equal to 150,000 Da, less than or equal to 100,000 Da, or less than or equal to 50,000 Da. Combinations of the above-recited ranges are also possible (e.g., the second material has an average molecular weight of greater than or equal to 1,000 Da and less than or equal to 500,000 Da, the second material has an average molecular weight of greater than or equal to 100,000 Da and less than or equal to 300,000 Da). Other combinations of average molecular weights for the second material (e.g., negatively charged polyelectrolyte) are also possible.

The first material comprising an electrophilic component (e.g., electrophilic polymer) may have any of a variety of suitable average molecular weights. For example, in some embodiments, the first material comprising an electrophilic component (e.g., electrophilic polymer) has an average molecular weight of greater than or equal to 500 Da, greater than or equal to 1,000 Da, greater than or equal to 50,000 Da, greater than or equal to 100,000 Da, greater than or equal to 150,000 Da, greater than or equal to 200,000 Da, greater than or equal to 250,000 Da, greater than or equal to 300,000 Da, greater than or equal to 350,000 Da, greater than or equal to 400,000 Da, or greater than or equal to 450,000 Da. According to certain embodiments, the first material comprising an electrophilic component (e.g., electrophilic polymer) has an average molecular weight less than or equal to 500,000 Da, less than or equal to 450,000 Da, less than or equal to 400,000 Da, less than or equal to 350,000 Da, less than or equal to 300,000 Da, less than or equal to 250,000 Da, less than or equal to 200,000 Da, less than or equal to 150,000 Da, less than or equal to 100,000 Da, less than or equal to 50,000 Da, or less than or equal to 1,000 Da. Combinations of the above recited ranges are also possible (e.g., the first material comprising an electrophilic component has an average molecular weight of greater than or equal to 500 Da and less than or equal to 500,000 Da, the first material comprising an electrophilic component has an average molecular weight of greater than or equal to 100,000 Da and less than or equal to 300,000 Da). Other combinations of average molecular weights for the first material comprising an electrophilic component (e.g., electrophilic polymer) are also possible.

The second material comprising a nucleophilic component (e.g., a nucleophilic polymer) may have any of a variety of suitable average molecular weights. For example, in certain embodiments, the second material comprising a nucleophilic component (e.g., a nucleophilic polymer) has an average molecular weight of greater than or equal to 500 Da, greater than or equal to 1,000 Da, greater than or equal to 50,000 Da, greater than or equal to 100,000 Da, greater than or equal to 150,000 Da, greater than or equal to 200,000 Da, greater than or equal to 250,000 Da, greater than or equal to 300,000 Da, greater than or equal to 350,000 Da, greater than or equal to 400,000 Da, or greater than or equal to 450,000 Da. In some embodiments, the second material comprising a nucleophilic component (e.g., a nucleophilic polymer) has an average molecular weight less than or equal to 500,000 Da, less than or equal to 450,000 Da, less than or equal to 400,000 Da, less than or equal to 350,000 Da, less than or equal to 300,000 Da, less than or equal to 250,000 Da, less than or equal to 200,000 Da, less than or equal to 150,000 Da, less than or equal to 100,000 Da, less than or equal to 50,000 Da, or less than or equal to 1,000 Da. Combinations of the above recited ranges are also possible (e.g., the second material comprising a nucleophilic component has an average molecular weight of greater than or equal to 500 Da and less than or equal to 500,000 Da, the second material comprising a nucleophilic component has an average molecular weight of greater than or equal to 100,000 Da and less than or equal to 300,000 Da). Other combinations of average molecular weights for the second material comprising a nucleophilic component (e.g., nucleophilic polymer) are also possible.

Figure 4:
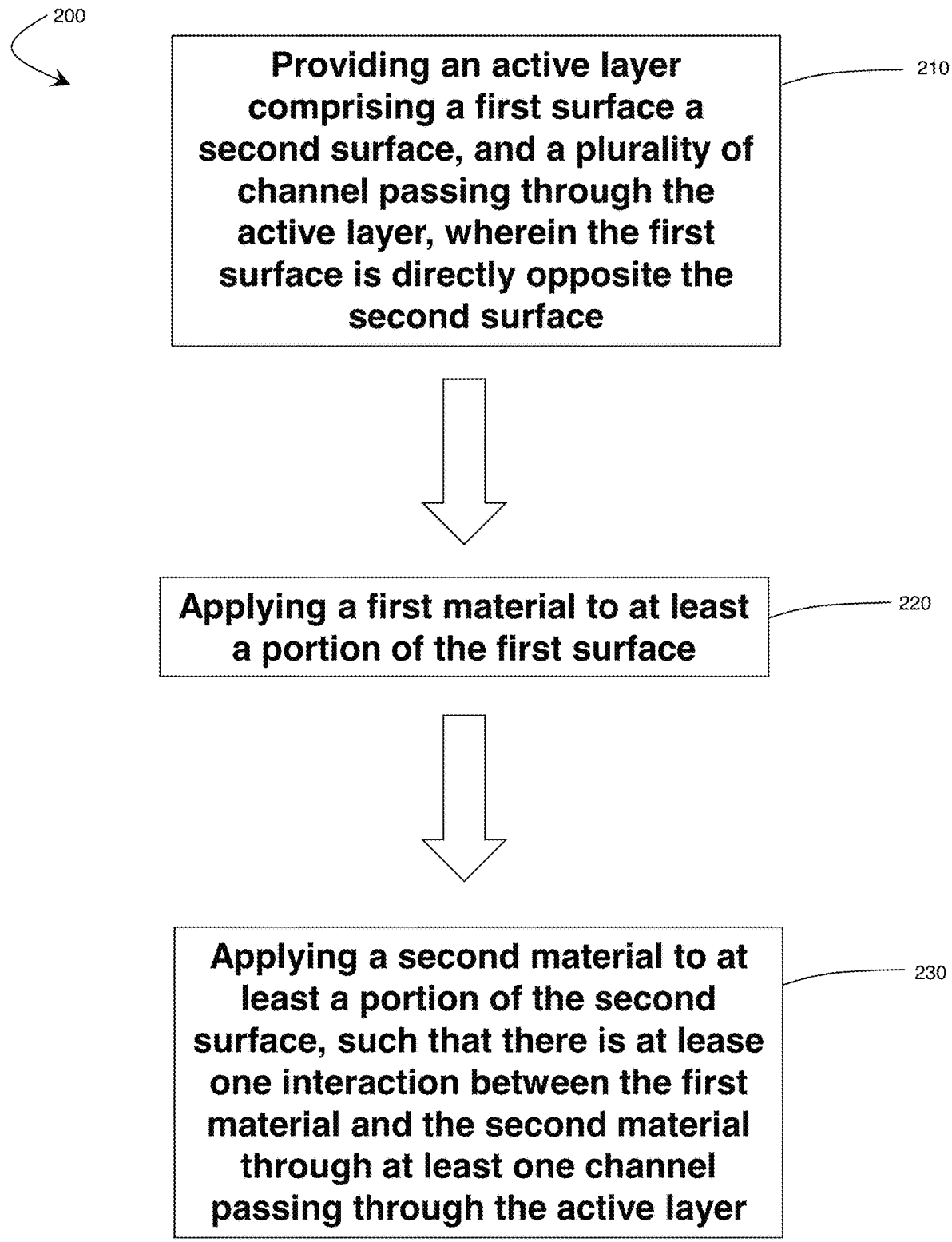
FIG. 4 is, according to certain embodiments, a schematic flow diagram of a method of coating an active layer.

Certain embodiments are related to a method of coating an active layer. FIG. 4 is, according to certain embodiments, a schematic flow diagram of a method of coating an active layer. In some aspects, method 200 of coating an active layer comprises step 210 of providing an active layer comprising a first surface, a second surface, and a plurality of channels passing through the active layer, wherein the first surface is directly opposite the second surface.

In some embodiments, the method further comprises applying a first material to at least a portion of the first surface, and applying a second material to at least a portion of the second surface. For example, referring to FIG. 4, method 200 comprises step 220 of applying a first material to at least a portion of the first surface, and step 230 of applying a second material to at least a portion of the second surface. In some embodiments, the second material may be applied to at least a portion of the second surface such there is at least one interaction between the first material and the second material through at least one channel passing through the active layer.

As is explained in greater detail below, depending on the particular embodiment, the first material and the second material may be applied to the first surface and the second surface, respectively, in the same state of matter, or different states of matter as the current disclosure is not so limited. For example, both the first material and the second material may be applied to opposite surfaces of the active layer as liquids, separate solutions comprising the first material and the second material, and/or gases.

According to certain embodiments, the first material is applied to the first surface of the active layer by exposing the first surface of the active layer to a solution comprising the first material. In some aspects, the second material is applied to the second surface of the active layer by exposing the second surface of the active layer to a solution comprising the second material. For example, in certain non-limiting embodiments, the active layer may be mounted in a diffusion cell, and one side of the diffusion cell may be filled with a solution of the first material such that the solution of the first material comes into contact with the first surface of the active layer, thereby coating the first surface of the active layer. Concurrently, or subsequently, a second side of the diffusion cell may filled with a solution of the second material such that the solution of the second material comes into contact with the second surface of the active layer, thereby coating the second surface of the active layer. Alternatively, in some embodiments, the first surface of the active layer may be dipped into a solution of the first material, and the second surface of the active layer may be subsequently dipped into a solution of the second material. In yet another embodiment, a solution of the first material may be sprayed onto the first surface of the active layer, and a solution of the second material may be sprayed onto the second surface of the active layer. Combinations of the above mentioned application techniques are also possible.

According to certain embodiments, the active layer may be disposed on a porous substrate. In some such embodiments, the first material may be applied to the first surface of the active layer by soaking a solution comprising the first material into the porous substrate that is in contact with the first surface of the active layer. The second material may be concurrently, or subsequently, applied using any of the aforementioned application techniques.

In certain aspects, the presence of the first material and/or the second material on the first surface and/or the second surface, respectively, may be evaluated and/or confirmed by spectroscopic techniques, such as X-ray photoelectron spectroscopy (XPS).

In certain embodiments wherein a solution comprising the first material is applied to the first surface of the active layer and/or a solution comprising the second material is applied to the second surface of the active layer, it may be particularly advantageous to employ a solution comprising the first material and/or a solution comprising the second material with a particular pH. According to some embodiments, the interaction between the first material and the second material may be initiated at a certain pH.

For example, in certain embodiments, a non-covalent interaction between a first material comprising a positively charged polyelectrolyte and a second material comprising a negatively charged polyelectrolyte may be initiated at an acidic pH (e.g., less than 7). In some embodiments, when applying the coating to opposite sides of the active layer, the solution comprising the first material and/or the solution comprising the second material may have a pH of greater than or equal to 1, greater than or equal to 2, greater than or equal to 3, greater than or equal to 4, greater than or equal to 5, or greater than or equal to 6. In certain aspects, when applying the coating to opposite sides of the active layer, the solution comprising the first material and/or the solution comprising the second material may have a pH of less than 7, less than or equal to 6, less than or equal to 5, less than or equal to 4, less than or equal to 3, less than or equal to 2. Combinations of the above-recited ranges are also possible (e.g., when applying the coating to opposite sides of the active layer, the solution comprising the first material and/or the solution comprising the second material may have a pH of greater than or equal to 1 and less than 7, when applying the coating to opposite sides of the active layer, the solution comprising the first material and/or the solution comprising the second material may have a pH of greater than or equal to 2 and less than or equal to 3). Other combinations are also possible.

In certain other embodiments, a covalent interaction between a first material comprising an electrophilic component (e.g., an electrophilic polymer) and a second material comprising a nucleophilic component (e.g., a nucleophilic polymer) may be initiated at a basic pH (e.g., greater than 7). In some embodiments, when applying the coating to opposite sides of the active layer, the solution comprising the first material and/or the solution comprising the second material may have a pH of greater than 7, greater than or equal to 8, greater than or equal to 9, greater than or equal to 10, greater than or equal to 11, greater than or equal to 12, or greater than or equal to 13. In certain aspects, when applying the coating to opposite sides of the active layer, the solution comprising the first material and/or the solution comprising the second material may have a pH of less than 14, less than or equal to 13, less than or equal to 12, less than or equal to 11, less than or equal to 10, less than or equal to 9, or less than or equal to 8. Combinations of the above-recited ranges are also possible (e.g., when applying the coating to opposite sides of the active layer, the solution comprising the first material and/or the solution comprising the second material may have a pH of greater than 7 and less than or equal to 14, when applying the coating to opposite sides of the active layer, the solution comprising the first material and/or the solution comprising the second material may have a pH of greater than or equal to 7 and less than or equal to 9). Other combinations are also possible.

While a particular arrangement for exposing the active layer to the first material and the second material has been depicted in the figures and described above, it should be understood that other arrangements for exposing the active layer to the first material and the second material are also possible. In some other embodiments, for example, the first material and is applied by depositing (e.g., using vapor deposition) the first material onto the first surface of the substrate, and/or the second material is applied by depositing (e.g., using vapor deposition) the second material onto the second surface of the substrate. Combinations of the application processes may be utilized (e.g., the first material may be applied to the first surface by exposing the first surface of the substrate to a solution comprising the first material, and the second material be applied to the second surface by depositing the second material onto the second surface).

In some aspects, the first material and the second material may coat the first surface and the second surface, respectively, at locations corresponding to one or more channels in the plurality of channels. For example, referring to FIG. 3, first material 118$a$ and second material 120$a$ are coating first surface 110 and second surface 112, respectively, at a location corresponding to channel 114$a$. In certain embodiments, the first material and the second material may at least partially adhere within one or more channels of the plurality of channels. For example, referring to FIG. 3, first material 118$c$ and second material 120$c$ are at least partially adhered within channel 114$c$. The first material and/or the second material may be applied in any other appropriate location depending on the first material and/or second material that has been employed and the application process used.

In some embodiments, the method steps of applying the first material and the second material to opposite sides of the active layer are performed after transferring the active layer to the substrate. In certain other embodiments, it is possible that applying the first material and the second material to the opposite sides of the active layer is performed prior to the active layer being transferred to the substrate.

In some embodiments, if the application of the first component and the second component is not appropriately controlled, the interaction between the two components may not be formed at the desired location (e.g., channel) on the active layer. Parameters that may be used to control the location of the interaction include, but are not limited to, appropriate choice of first materials and/or second materials, a pressure on either surface of the active layer, a surface tension of the two components with the active layer and/or substrate, and/or a functionalization of the active layer and/or substrate. For example, in a non-limiting embodiments, at least a portion of the first surface of the active layer may be functionalized to be hydrophobic and at least a portion of the second surface of the active layer that is opposite the first surface may be functionalized to be hydrophilic, and certain first materials and/or second materials (e.g., based on composition, molecular weight, etc.) may be applied to the hydrophobic first surface and the hydrophilic second surface, respectively, thereby initiating the interaction between the first material and the second material at one or more predetermined, functionalized locations on the active layer.

Without wishing to be bound by theory, it may be advantageous to introduce selective sub-nanochanels, nanochannels, or microchannels, or pores with other desired sizes, into the active layer after applying the first material and the second material to opposite sides of the active layer in order to create a highly selective filtration membrane. In some embodiments, the channels may be introduced by any of the aforementioned techniques (e.g., ion bombardment, chemical etching, etc.).

The disclosed methods of manufacture, and the resulting membranes, may be applied to any number of different applications. In certain embodiments, the membranes may be used as filtration membranes and/or molecular sieves for gas-phase or liquid-phase separation processes by reducing or eliminating the permeance of non-selective, uncontrolled channels. For example, some commercial applications of the described membranes include, but are not limited to: water purification to remove pathogens, organic molecules, and salts (desalination/softening); organic solvent filtration; portable water filters; preconcentrators for liquid or gas samples for use in sensing applications; gas separation in energy applications such as natural gas separation (methane from carbon dioxide, hydrogen sulfide, and heavier hydrocarbons); carbon sequestration; dialysis in biological research; medical implants for allowing only select molecules to go through (e.g., for sensor applications); controlled drug release devices; and/or in fuel cells as proton-selective membranes, to name a few.

In a preferred application, for example, the membrane may be used as a filtration membrane. In some embodiments, the filtration membrane may be used for a method of filtering a substance, the method comprising providing any embodiment of the aforementioned membrane and filtering the substance (e.g., water comprising pathogens, organic solvents, salts, organic dyes, etc.) through the membrane.

For commercial applications, increasing the durability of the membrane may be desirable. Therefore, in some embodiments, a protective coating may be applied to the active layer to ensure that the membrane will function effectively after repeated handling and/or use. For example, the protective layer might be used to provide mechanical protection and/or antifouling properties such as anti-scaling or anti-biofouling. Appropriate protective layers include, but are not limited to: polymers deposited by layer-by-layer assembly such as polyethyleneglycol, polyamide, polysulfone, polyanionic and polycationic polymers; zwitterionic molecules; and nanoparticles such as silver and titania nanoparticles.

It may be advantageous for commercial applications to employ a coated active layer as use for a filtration membrane that is stable for extended periods of time. In certain embodiments, the coating of the first material on the first surface of the active layer and the second material on the second material of the active layer is stable (e.g., in aqueous conditions, in the ambient) for at least one day, at least one week, at least two weeks, at least one month, and the like.

The embodiments described above have been directed to affecting the through-size of channels in an active layer that includes only a single layer. However, the current disclosure is not limited to affecting the through-size of channels in a single active layer. Instead, the disclosed methods are capable for use on a membrane active layer including any number of layers (e.g., two layers, three layers, four layers, etc.). In some embodiments, for example, multiple individual active layers may be included to form an overall active layer when the active layer is applied to a supporting substrate. More specifically, in some embodiments, providing a plurality of active layers may advantageously increase the covered area of the substrate because when a plurality of active layers of the same size and shape are placed on a substrate, each will be randomly misaligned. However, it is highly improbable that any would be misaligned in exactly the same way. Therefore, some of the area of the substrate left uncovered by one active layer would likely be covered by subsequently placed active layers. Consequently, the uncovered area of the substrate may be reduced when a plurality of active layers are used. Other applications of multiple active layers are also possible. Additionally, while the individual active layers have been depicted as being in direct contact, in some embodiments, intermediate layers may be positioned between these adjacent active layers. Appropriate intermediate layers include: chemical cross-linkers with reactive terminal groups such as diazonium; different polymers such as poly(dimethylsiloxane), polycarbonate, and polyamide; layers of atomic layer deposited material such as alumina and hafnia; and other appropriate materials.

Figure 5:
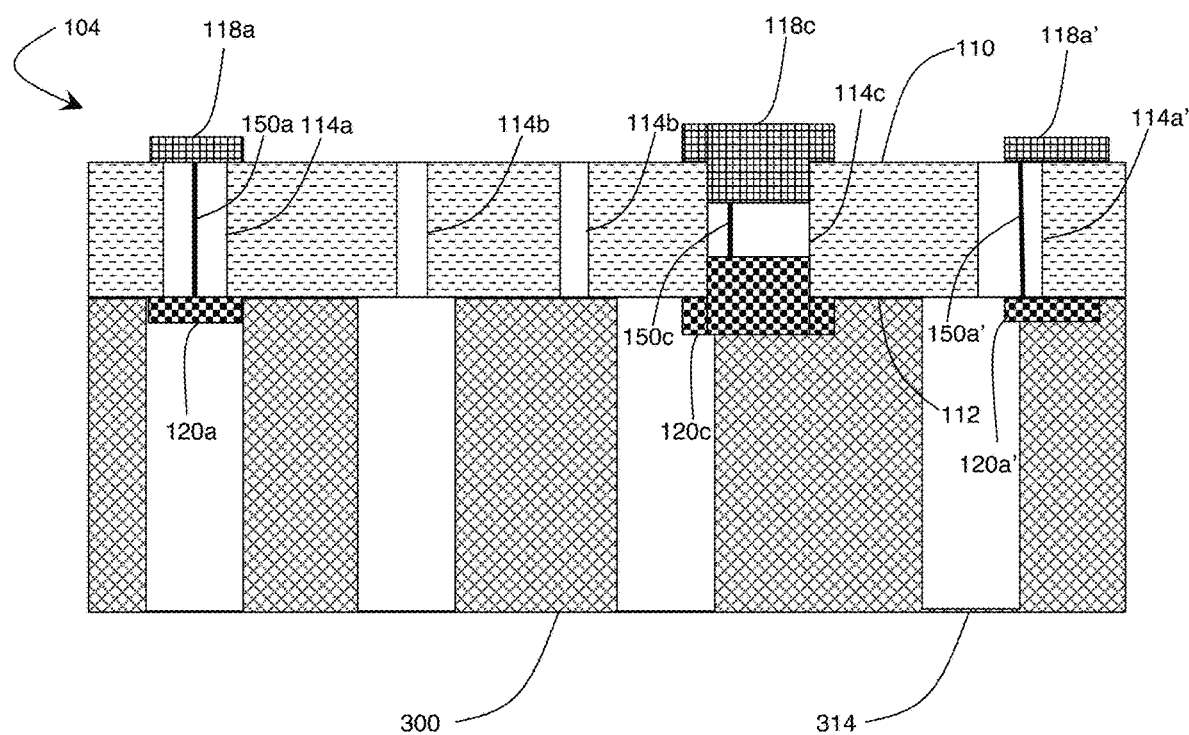
FIG. 5 is, according to some embodiments, a cross-sectional schematic diagram of an active layer disposed on a porous substrate.
Figure 6:
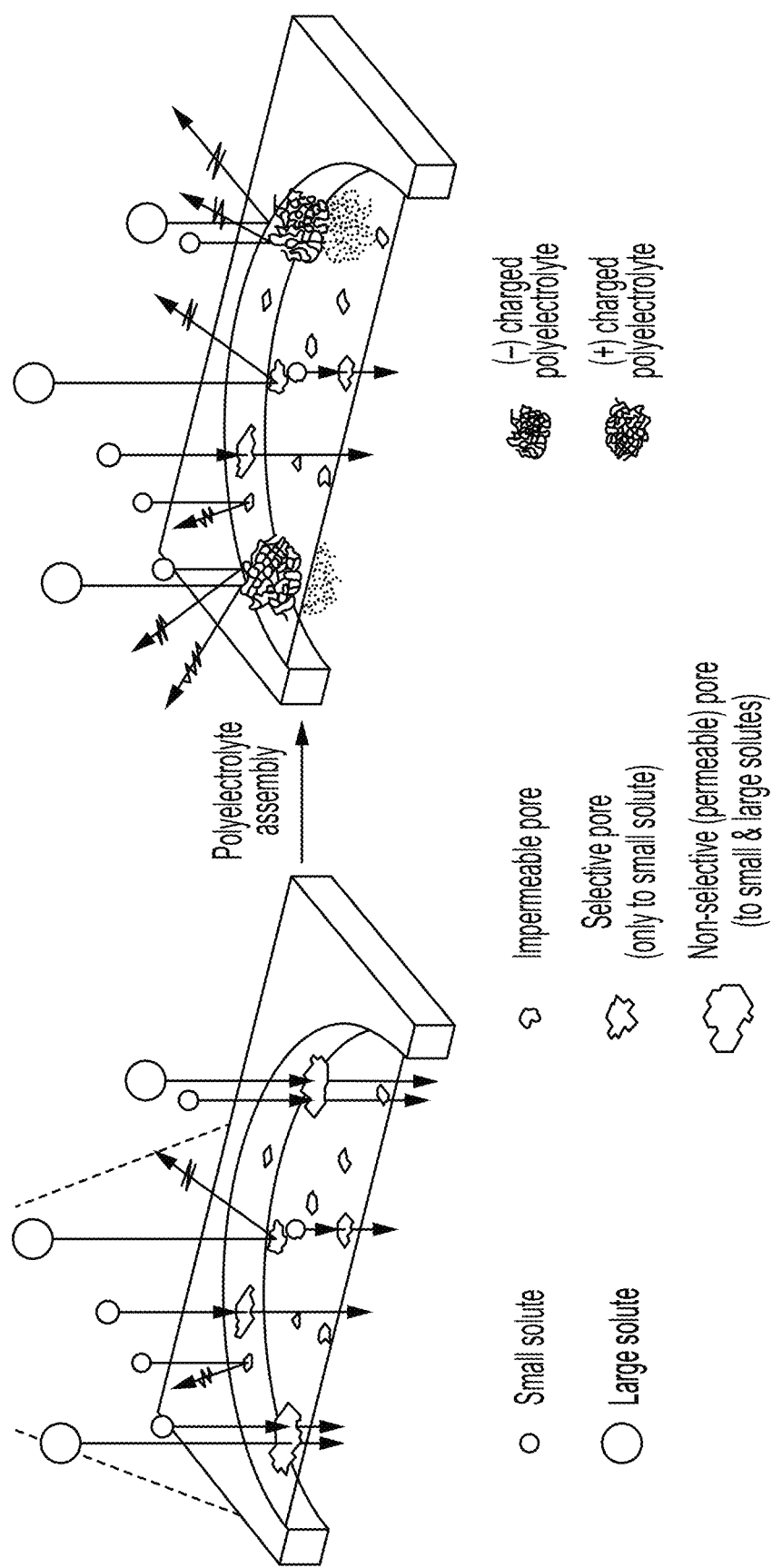
FIG. 6 is a schematic diagram of the assembly of a first material and a second material across large channels in an active layer.

In certain embodiments, the active layer may be disposed on a substrate. FIG. 5 is, according to some embodiments, a cross-sectional schematic diagram of an active layer disposed on a substrate. As shown in FIG. 5, active layer 104 comprising a plurality of channels 114 is disposed on porous substrate 300. In certain embodiments the porous substrate includes a plurality of pores 314. As depicted in FIG. 6, pores 314 are aligned pores similar to a track-etched membrane. However, porous substrates including unaligned random pore networks are also possible. For example, graphene based filtration membranes, and other similar membranes, may be combined with a variety of supporting substrates including, but not limited to, porous ceramics, porous metals, polymer weaves, nanofiltration membranes, reverse osmosis membranes, ultrafiltration membranes, brackish water filtration membranes, or any other appropriate substrate.

Depending on the particular embodiment, the porous substrate disposed beneath the active layer may provide structural support to the membrane and may also impede flow through channels present in the one or more active layers that are not occluded, or otherwise mitigated. The porous support may provide sufficient resistance to flow through areas where large imperfections in the active layer exist, such that flow through the intended pores may still dominate the overall flow through the composite membrane. For example, the porous support may be a polycarbonate track-etched membrane with pore diameters in the range of 5 nm to 10 micrometers, and pore lengths (e.g., support layer thickness) in the range of 1 micrometer to 5 mm. Alternatively, the porous support might be a ceramic support with pores in the size range of 10 nm to 10 micrometer, and a thickness in the range of 100 micrometer to 10 mm. Furthermore, the support structure itself may include multiple layers. For example, the polycarbonate layer may rest on a sintered steel porous support. Furthermore, it should be understood that the graphene may be disposed on any other appropriate membrane or substrate. For example, asymmetric polyamide membranes used for reverse osmosis of brackish water or seawater might be used. In such an embodiment, the pore sizes of the membrane may be less than 10 nanometers or less than 1 nanometer.

Example 1

The following example describes the application of a first material and a second material to an active layer in order to improve the selectivity of the active layer.

Scaling up graphene membranes to areas comparable to commercially available ones will inevitably entail creation of non-selective graphene defects, at any stage of membrane fabrication including graphene synthesis, transfer to substrate, or pore creation process. Transport measurements and modeling have suggested that large pores show low resistance to diffusive transport, leading to significant solute leakage undermining membrane selectivity. Therefore, after creating nanopores in graphene, their size distributions are narrowed down by targeting large pores and defects and selectively mitigating leaky transport.

To selectively seal large, leaky pores while leaving small, selective pores relatively intact, assembly of large polymers across defective regions in graphene was employed. For example, oppositely charged polyelectrolytes of high molecular weights, introduced to the opposite sides of a membrane, electrostatically perceive the presence of each other more strongly across large openings in graphene than across pristine graphene regions (FIG. 6). The polyelectrolytes electrostatically attract their counterparts and form compounds via strong ionic bonding between repeating units of electrolyte groups. The resulting assembly successfully seals the large graphene pores and provides steric hindrance to non-selective solute transport. Furthermore, the smaller dimension of selective water-permeable pores will present a higher entropic barrier to the high molecular-weight polyelectrolytes to orient themselves and access, thereby minimally affecting the permeance of graphene nanopores to water.

The positively charged polycations include polyallylamine (PAH), polyethylenimine (PEI), poly(diallyldimethylammonium) (PDDA), and/or poly(methacryloyloxyethyl trimethylammonium chloride), while polystyrene sulfonate (PSS) and/or polyacrylic acid (PAA) are examples of negatively charged polyanions.

The graphene membrane was mounted in a diffusion cell, and a polycation solution (Mw ~65,000 Da PAH, 20 mM solution in 1 M NaCl) was introduced to the polycarbonate membrane side reservoir of the cell. The graphene side was filled with a polyanion solution (Mw ~70,000 Da PSS, 20 mM solution in 0.5 M NaCl) so that the negatively charged sulfonate groups in PSS would not be in direct contact with unreacted amine groups of nylon-6,6 in polycarbonate pores. High molecular weights of the electrolytes prevent the diffusion of each species to the opposite sides of the membrane as the nylon-6,6 plugs from interfacial polymerization ensure mitigation of diffusive transport across large nanometer pores. The pH of both solutions was maintained at 2.3 with 10% HCl, since PAH, a weak polycation, needs to be sufficiently protonated, while a strong polyanion PSS can maintain its charge density even at low pH. After 10 minutes of vigorous stirring of each solution with magnetic stir bars, both sides of the cell were rinsed twice with pH 2.3 PBS for 2 minutes each, followed by four deionized water rinse for 2 minutes each.

Diffusion measurements of KCl and Allura Red indicate that the polyelectrolyte treatment can efficiently mitigate diffusive pathways for solutes. A vertically bombarded membrane followed by 75 seconds of oxygen plasma etching initially exhibited 53% and 91% coverage to KCl and Allura Red diffusion, respectively, as compared to transport across a bare polycarbonate membrane. After the PSS(−):(+)PAH assembly, the KCl and Allura Red diffusive transport substantially diminished with 77% and 96% coverage, respectively, amounting to 50% and 52% reduction. The decrease in diffusive transport indicates that the oppositely charged polyelectrolyte assembly is able to mitigate diffusive leakage across large, non-selective pores.

Figure 7:
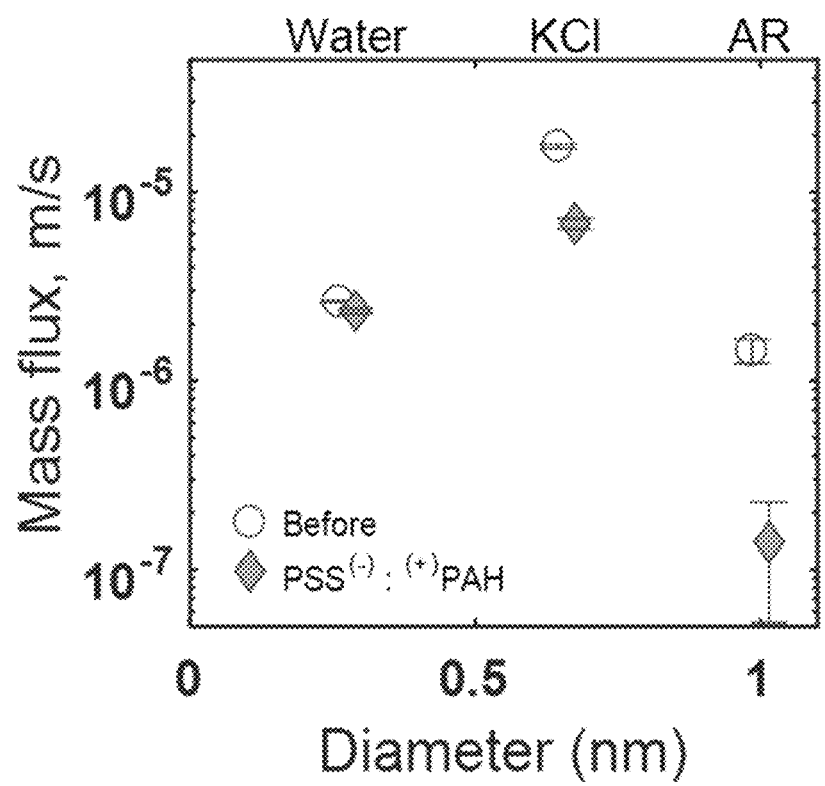
FIG. 7 shows transport measurements of water, KCl, and Allura Red before and after electrostatic assembly of polyelectrolytes across an active layer.

On a less permeable membrane, bombarded at an incidence angle of 52° and etched for 50 seconds, the PSS(−):(+)PAH assembly reduced 61% and 90% of the initial KCl and Allura Red leakage, respectively, enhancing the membrane selectivity between the two from 12 to 48 (FIG. 7). The dramatic improvement in selectivity is highly attributed to notably high (99.1%) coverage to Allura Red, which is indicative of almost complete mitigation of non-selective pores above a nanometer. The transport measurements were reliably reproducible over a three-week interval, possibly for a longer period of time, suggesting the stability of PSS(−):(+)PAH assembly in an aqueous environment.

Osmotically driven flux of water molecules, which are capable of accessing pores smaller than the hydrated salts, experienced only 10% decrease after the polyelectrolyte assembly (FIG. 7). A low density of large pores that are highly permeable to water molecules under forward osmosis will be directly affected by the PSS(−):(+)PAH assembly to result in a significantly diminished water flux. However, almost the entire population of pores permeable to the draw solutes (glycerol ethoxylate, average Mn ~1,000 with diameter ~1.2 nm) are effectively sealed by the polyelectrolyte pair, as demonstrated by near-complete hindrance of Allura Red transport. This ensures minimization of internal concentration polarization of the draw solutes within support polycarbonate pores and the draw solution's osmotic pressure can nearly flawlessly translate to effective osmotic pressure differential across nanoporous graphene to drive water transport. Thus, the improved selectivity assists in controlling the concentration polarization and maintaining water flux under forward osmosis, in spite of the loss of major water transport channels.

Example 2

The following example describes the application of materials to an active layer as controls for comparing to the coated active layer described in Example 1.

Treating graphene membranes with oppositely charged polyelectrolytes of high molecular weights significantly reduces solute diffusive leakage to enhance membrane selectivity, as described above. To test the hypothesis that the decrease in transport is only observed when the opposite polyelectrolytes are introduced to opposite sides of a graphene membrane, graphene membranes were treated with the same type of polyelectrolytes on both sides and transport measurements before and after the treatment were compared. A fresh graphene membrane was treated with polyelectrolytes following the identical procedure as described above for Example 1, but with negatively charged PSS(−) only on both sides. Similarly, a separate control membrane was prepared and treated with positively charged PAH(+) only.

The PSS(−):(−)PSS treatment brought only 5.7% decrease in KCl diffusion, which was within the measurement uncertainties (FIG. 8A and FIG. 8B). Allura Red experienced a slightly greater reduction of 13.8%, which could be attributed to electrostatic repulsion between weakly adsorbed PSS on graphene pores and negative charged Allura Red molecules. Nevertheless, the degrees of transport reduction for both solutes were lower by several factors than ≥50% decrease in the PSS(−):(+)PAH case. While a 9.3% drop in KCl diffusion was observed after the PAH(+):(+)PAH treatment, Allura Red transport considerably rose by 37.4% (FIG. 8A and FIG. 8B). Negatively charged graphene pores could be favorable adsorption sites for PAH, whose positively charged amine groups may electrostatically enhance Allura Red transport. The control treatments with PAH or PSS demonstrated that reduction in solute diffusive leakage is achieved when polycation or polyanion is accompanied by its counterpart at the opposite side of the membrane.

The control PSS(−):(−)PSS and PAH(+):(+)PAH membranes were further treated with PAH and PSS solution, respectively, on both sides. This process consequently exposed the original graphene membrane to solution of polyanions, followed by the oppositely charged polycations (or, in reverse order), to result in bilayers of PSS and PAH on both sides of the membrane.

When the control PSS(−):(−)PSS membrane was further treated with PAH solution, or PAH(+) PSS(−):(−)PSS(+)PAH case, the measured KCl diffusion was only 1.5% greater than that across the original untreated membrane (FIG. 8A and FIG. 8B). Allura Red also exhibited transport reduction as low as 11.4%, which almost negligibly changed from the control membrane treated with PSS only.

Additionally, PSS(−) PAH(+):(+)PAH (−)PSS treatment exhibited a greater decrease of 35.6% in KCl flux from the original membrane, and, even when compared to the PAH (+):(+)PAH case, the reduction amounted to 29.0% (FIG. 8A and FIG. 8B). This trend may suggest that bilayers PSS(−) PAH(+):(+)PAH (−)PSS were more effectively formed compared to the opposite PAH(+) PSS(−):(−)PSS (+)PAH case, as PAH could strongly interact with negatively charged pores in untreated graphene membrane and form densely adsorbed first layers. As a result, the second layers of PSS can adsorb on the existing PAH and the resulting bilayer films, if preferentially sitting on the porous regions of graphene, will retard transport. Allura Red transport, which initially had been enhanced after control the PAH(+):(+) PAH treatment, recovered its original value with further PSS coating, demonstrating the reversal of the dominant surface charge from positive to negative due to the outermost PSS layers.

Irrespective of the order in which the polycations and polyanions were stacked on graphene, none of the control treatments with same charges on both sides resulted in as great diffusive leakage mitigation as the PSS(−):(+)PAH assembly observed. The measurements suggest that transport characteristics of graphene membranes can be tuned by deploying different combinations of polyelectrolytes, but a significant drop in solute diffusion is achieved when polycations and polyanions are introduced to the opposite sides of a membrane.

Example 3

The following example describes the evaluation of the assembly of a first material and a second material on an active layer.

Transport measurements demonstrated that oppositely charged polyelectrolyte assembly resulted in a significant reduction in solute diffusive leakage, as described in Example 1. Quantitative comparison of surface chemical composition among membranes treated with different polyelectrolyte combinations illustrate that electrostatic attractions between opposite charges is the main driving force for the molecular assembly.

X-Ray Photoelectron Spectroscopy (XPS) was selected as a suitable surface analysis tool, to probe the chemical composition of graphene membranes after different treatments. As the photoelectrons induced by the incident X-rays are emitted from the top few atomic layers of the target material, XPS is capable of detecting species not only on top of the sample, but also underneath the atomically thin graphene. Therefore, both of the polyelectrolytes forming compounds across nanoporous graphene are detectable from irradiating only one side of the membrane sample.

A graphene membrane after interfacial polymerization was bombarded with gallium ions at incidence angle of 52° and etched with oxygen plasma for 50 seconds. The membrane was then was soaked in 10 mM diphenylacetyl chloride solution in ethanol for 45 minutes and rinsed with four separate ethanol baths. This treatment was to functionalize unreacted amine groups of nylon-6,6 with acyl chloride and thus minimize reaction between PSS and the primary amine, which could be a potential noise in probing polyelectrolyte assembly. The membrane was then cut into four smaller pieces, three of which were treated with PBS:(−)PSS, PAH (+):PBS, and PAH(+):(−)PSS, respectively, in a diffusion cell. Three separate membranes followed by the identical procedure were prepared in total, to account for variabilities from membrane to membrane.

XPS measurements were carried out using a PHI VersaProbe II Scanning XPS Microprobe. Four different spots in each sample were selected as analysis points and Scanning X-ray Induced secondary electron images (SXI) were used to confirm that areas of inspection were falling on each of the specified locations. The surface analysis was performed at pass energy of 187.85 eV, swiping a wide range of binding energy multiple times to enhance photoelectron signals. Nitrogen in amine groups of PAH and sulfur in sulfonate groups of PSS were the target elements for the XPS analysis, whose peaks in the resulting spectrum will help quantify the amount of each species.

XPS measurements on the control samples not treated with polyelectrolytes showed predominance of carbon (~70-80% by molar ratio among detected elements), accompanied by local peaks of oxygen, nitrogen, and sulfur, and hints of silicon at some locations. Unreacted hexamethylenediamine and nylon-6,6 from interfacial polymerization are mostly responsible for the nitrogen peaks, and functionalization of pores by oxygen plasma etching will also partially contribute to the nitrogen and oxygen signals. Sulfur might be from residual ammonium persulfate etchant during the graphene transfer process. Sporadically detected silicon might have originated from ambient air of the lab with heavy PDMS use or from shared research facilities such as plasma cleaner or focused ion beam.

The atomic concentrations for nitrogen and sulfur calculated from the control samples were subtracted from the measurements on the polyelectrolyte-treated ones, so that the contributions to the signals only from PAH and PSS could be accounted for and directly compared. The samples treated with PBS:(−)PSS showed a slightly decreased nitrogen concentration with a small ~0.05% increase in sulfur signal (FIG. 9A and FIG. 9B). Additionally, a 0.5% rise in the nitrogen ratio was observed in PAH(+):PBS samples, which could be attributed to PAH's adsorption to negatively charged graphene pores, but almost no change (0.01%) in sulfur concentration. When the membranes had been treated with either of the polycations without its counterpart, the photoelectron signals for nitrogen and sulfur were nearly indistinguishable from the measurements on the non-treated samples. An increase, if any, in concentration of one element was not accompanied by a rise in the other, suggesting that polyelectrolyte adsorption on graphene membranes might be at place and responsible for the signals, in part. Uncertainty in the measurements might have originated from variabilities in membranes, including nylon-6,6 formation, residual ammonium sulfate, plasma-induced functional groups, or the number of pores/defects in graphene, all of which could substantially influence nitrogen and sulfur concentrations at each inspected locations.

The membranes treated with oppositely charged polyelectrolytes experienced simultaneous rises in both nitrogen and sulfur concentrations. XPS measurements on the PAH(+): (−)PSS samples exhibited the highest ~1% increase in nitrogen ratio, accompanied by the highest 0.11% rise in sulfur (FIG. 9A and FIG. 9B). Although adsorption of each polyelectrolyte on graphene could account for the rises in concentrations to some extent, the signals sufficiently higher than those measured in the control samples provide indirect evidence for the electrostatic assembly of polyelectrolytes across large graphene pores. Quantitative comparison between samples reveals enhanced signals for the target elements in PAH(+):(−)PSS samples, allowing for the inference that the polyelectrolytes are capable of electrostatically attracting each other across single layer nanoporous graphene.

Example 4

The following example describes the application of a first material and a second material to an active layer without introduced pores.

In an effort to eliminate contributions from pore functional groups to photoelectron signals and minimize interaction between polyelectrolytes and graphene pores, graphene membranes without introduced pores were treated with the polyelectrolytes. Following the same procedure as described in Example 1 but the pore creation steps, polyelectrolyte treatments were carried out on three separate membranes so that the assembly could take place across the existing pores and defects in graphene. Again, four different points were randomly selected in each sample and XPS analysis was performed to measure nitrogen and sulfur contents.

The atomic concentrations of untreated samples were deducted from the signals measured in polyelectrolyte-treated samples. Contrary to the case with graphene membranes with pores, the PAH(+):PBS treatment did not result in enhanced nitrogen concentration at almost all the inspected locations, with a negligible change in sulfur content (FIG. 10A and FIG. 10B). The PBS:(−)PSS samples experienced a significant rise in sulfur ratio, accompanied by a slightly reduced nitrogen concentration. The measured trends after polyelectrolyte treatments that are distinctly different from the nanoporous graphene membrane cases are likely to be due to the absence of introduced pores, which are reported to possess negative charges. Therefore, the adsorption of positively charged PAH to graphene surface is limited, while PSS of negative charge experiences less electrostatic repulsion from graphene pores. Again, simultaneous increases nitrogen and sulfur concentrations were only observed in the PAH(+):(−)PSS samples, suggesting that the two polyelectrolytes can electrostatically interact across atomically thin graphene (FIG. 10A and FIG. 10B). Without fabricated pores in graphene, different nylon-6,6 plug formations are likely to induce the largest variabilities in nitrogen contents for each measured location.

Example 5

The following example describes the application of a first material and a second material to an active layer that form a covalent interaction through at least one channel of the active layer.

Similar to the electrostatic assembly of oppositely charged polyelectrolytes, molecular conjugation of high molecular weight crosslinking agents was investigated to mitigate solute diffusive leakage across non-selective graphene pores. Primary amine groups easily react with NHS ester activated crosslinkers to form stable amide bonds, while releasing NHS leaving groups. Following the principle of polyelectrolyte assembly, the resulting amide bond extends across large graphene pores and anchors the entire high molecular weight conjugate in place, hindering solute diffusive leakage across the membrane (FIG. 11A and FIG. 11B).

In order to help the molecules orient and extend their reactive ends and promote conjugation, branched or multi-armed structure was considered as the key requirement, along with high molecular weight, when selecting the crosslinking agents. Multi-branched polyethylenimine (PEI, $M_w$ ~800) and four-armed PEG N-hydroxysuccinimide (PEG-NHS, Mn ~2,300) were selected as the crosslinking agents qualifying the criteria. The reaction between amine and NHS is dependent on pH, which requires a close control of the pH of each solution. NHS esters are subjected to hydrolysis in aqueous solution of high pH, resulting in a free NHS leaving group and non-reactive carboxylic acid—its half-life can drop from 4-5 hours at pH 7.0 to 10 minutes at pH 8.6. At low pH, the amine groups partially undergo protonation and the crosslinking between amine and NHS could be constrained. Therefore, the pH of each solution was adjusted to a compromising value between 7.2 and 8.5 to retain amine reactivity but minimize hydrolysis of NHS.

After measuring osmotic water flux and solute diffusion, without dismounting the graphene membrane from the cell, both reservoirs of the cell was filled with pH 7.4 PBS to bring up the pH around the membrane. The PBS was withdrawn and 100 mM PEI solution of pH 7.4 in PBS was introduced to the polycarbonate membrane side of the cell, while the graphene side of the cell was filled with 10 mM PEG-NHS solution of pH 7.4 in PBS. Both sides were vigorously mixed with magnetic stir bars for 16 hours. Then the cell were rinsed twice with pH 7.4 PBS for 2 minutes each, followed by six deionized water rinse for 2 minutes each.

Figure 12:
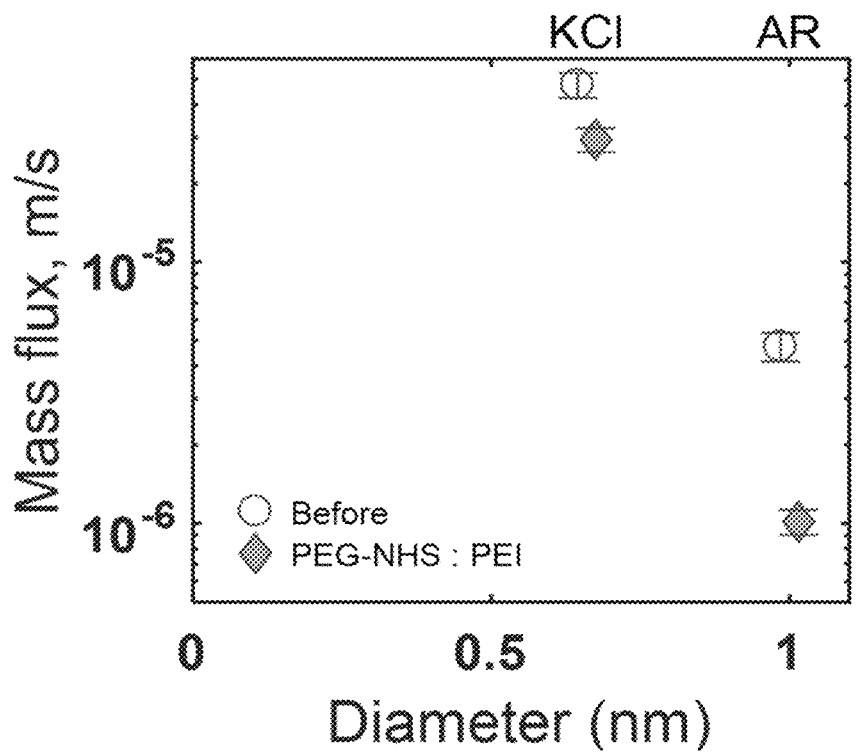
FIG. 12 shows transport measurements of KCl and Allura Red before and after covalent assembly of polymers across an active layer.

Similar to the polyelectrolye assembly, PEG-NHS:PEI conjugation also resulted in a decline in both KCl and Allura Red. A vertically bombarded membrane etched with 60 seconds of oxygen plasma experienced beyond 30% and 50% decrease in KCl and Allura Red diffusive transport, respectively, after PEG-NHS:PEI conjugation (FIG. 12). No reduction in solute diffusion was observed when the membrane was only treated with either PEG-NHS or PEI, suggesting that the crosslinking between the reactive amine and NHS arms, extending across leaky graphene pores, is responsible for mitigation of non-selective solute transport. Interestingly, as it was the case for the positively charged PAH solution, when the membrane was exposed to the amine containing PEI solution only, an 80% rise in Allura Red diffusion was observed. PEI could easily adsorb onto negatively charged graphene pores, shielding the Allura Red molecules with negative charges from electrostatic repulsion retarding the transport.

Example 6

The following example describes the size-selective mitigation of channels in an active layer.

Figure 13:
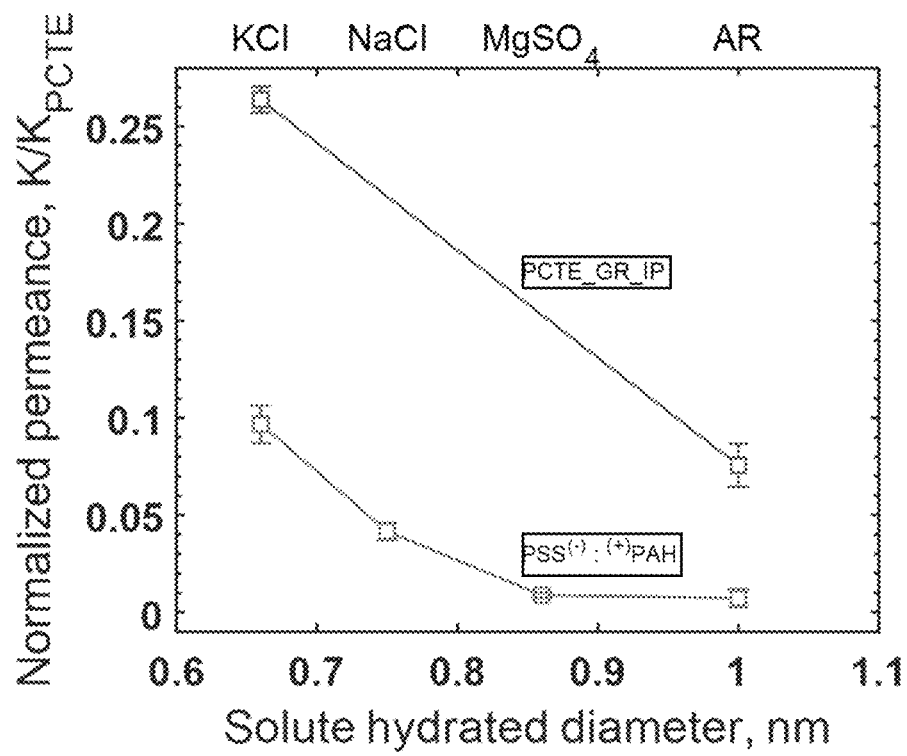
FIG. 13 shows measured diffusive permeance to KCl, NaCl, $MgSO_4$ and Allura Red before and after electrostatic assembly of polyelectrolytes across an active layer.

The electrostatic or covalent assembly of high molecular weight polymers significantly reduced solute diffusive leakage, as described above in Example 1 and Example 5. In addition to ≥99% coverage against Allura Red, the PSS(−): (+)PAH treated membrane measured exhibited remarkable 99.1% coverage against $MgSO_4$ diffusion as well to impart a high selectivity between hydrated monovalent and divalent salts (FIG. 13). Almost complete coverage of the divalent salts and the organic molecules was achieved without appreciably compromising water flux under forward osmosis, implying that the polyelectrolyte-assembled graphene membranes could be a useful platform for nanofiltration.

Nevertheless, monovalent KCl and NaCl diffusion still remained even after ~60% reduction in diffusive transport brought by the assembly. The membrane exhibited 90.3% and 95.8% coverage for KCl and NaCl diffusion, respectively, and clear size-selectivity in transport between the two monovalent salts and the larger species was observed (FIG. 9). For example, selectivity of KCl flux over $MgSO_4$ amounted to 52.9%, showing superior monovalent-divalent ions separation under diffusion. The transport measurements suggest that diminished diffusion of KCl and NaCl might have originated mostly from mitigation of pores larger than hydrated $Mg^{2+}$, $SO_4^{2-}$ and Allura Red molecules and partially from blockage of a fraction of pores in a size range between monovalent and divalent ions. Such prominent mono-divalent selectivity could be an indication that the pores below certain size may remain unsealed by the PSS (−):(+)PAH assembly.

High molecular weight polyelectrolytes (65,000 Da for PAH and 70,000 Da for PSS) prevent them from diffusing to the opposite sides of the membrane and help the compound stay in place across large pores to impede solute transport. However, at the same time, they will experience high entropic barriers when orienting and aligning themselves to access relatively smaller graphene pores. If either of polycations or polyanions are subject to an elevated barrier due to presence of charges or functional groups around the smaller pores, possibly repulsion between negatively charges of PSS and graphene pores, it will become extremely difficult for the two to assemble across small openings in graphene.

Therefore, assembly of polyelectrolytes with lower molecular weights were explored, targeting relatively smaller leaky pores that were not sealed with the larger pair. Polyacrylic acid (PAA) with $M_w$ ~1,800 Da was selected as a polyanion candidate, and PAH, with lower molecular weight ($M_w$ ~17,000 Da), was used as polycations for the assembly. While PAA had molecular weight lower by a factor of 40 compared to the original PSS, the new PAH had ~25% the molecular weight of the old one. This was intended to lower the barrier for the polyanions to access negatively charged graphene pores and also, in part, to maintain at least one of the polyelectrolyte pair fairly larger than the other so that pores of a wider size range could be affected and sealed by the assembly.

Figure 14:
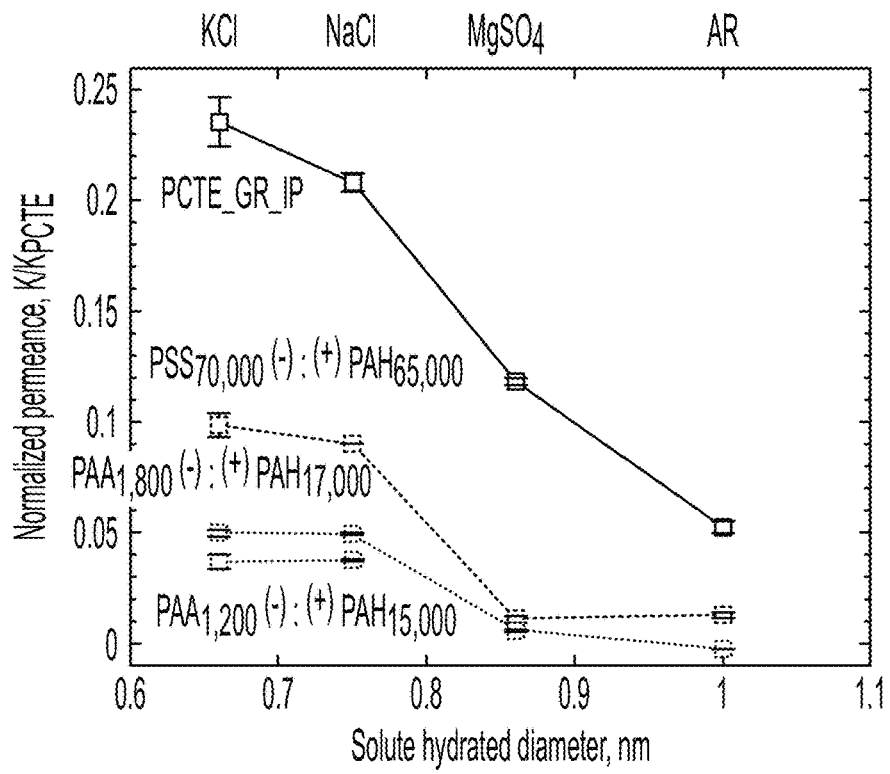
FIG. 14 shows measured diffusive permeance to KCl, NaCl, $MgSO_4$ and Allura Red before and after electrostatic assembly of various polyelectrolytes in the order of decreasing molecular weight.

Interfacial polymerization was performed on a fresh graphene membrane, on which pores were created with inclined (52° incidence angle) ion bombardment and 50 seconds oxygen plasma etching. Solute diffusion and osmotic water flux was measured across the membrane before and after the original $PSS_{70,000}$(−):$PAH_{65,000}$ assembly to mitigate larger leaky pores first. After the assembly, the membrane's coverage to diffusion improved from 77.6% to 90.2% for KCl, from 79.2% to 91.0% for NaCl, from 88.2% to 99.1% for $MgSO_4$, and from 94.7% to 98.7% for Allura Red, respectively (FIG. 14). Remaining ~10% diffusive transport of the monovalent salts indicated incomplete sealing of smaller leaky pores by the large polyelectrolyte pair. 20 mM solutions of $PAA_{1,800}$ and $PAH_{17,000}$ were prepared in 0.5 M NaCl, and introduced to the graphene and polycarbonate sides to ensure that each side is exposed only to polyanions or polycations, respectively, following the previous assembly. The initial pH values of PAA and PAH aqueous solutions were around 3.5 and 11, respectively, and they were adjusted to ~6.5 so that both of the polyelectrolytes are sufficiently charged for electrostatic assembly between the carboxylate groups and amine groups. Both sides were vigorously mixed with stir bars for 10 minutes and then rinsed twice with pH 6.5 PBS for 2 minutes each, followed by four deionized water rinse for 2 minutes each.

The second assembly of smaller polyelectrolyte pairs clearly sealed the residual leaky graphene pores and resulted in greater coverage against all the solutes (FIG. 14). Membrane exhibited 95.0% coverage for both KCl and NaCl after the $PAA_{1,800}$(−):(+)$PAH_{17,000}$ assembly, corresponding to 48.9% and 45.0% reduction in diffusive transport, respectively, compared to the values after the first assembly. Nearly ~50% decline in diffusion of both monovalent salts may be indicative of further improvements by the lower molecular weight polyelectrolyte pair in sealing a fraction of pores that are in a diameter range between hydrated monovalent and divalent ions. In addition, remaining $MgSO_4$ and Allura Red leakage was further mitigated, with coverage of 99.4% and 100.2% respectively (FIG. 14). Coverage over 100% for Allura Red should be interpreted as almost negligible Allura Red transport under diffusion or drift, since the UV-Vis signal-to-noise ratio was extremely low over the course of measurements.

Figure 15:
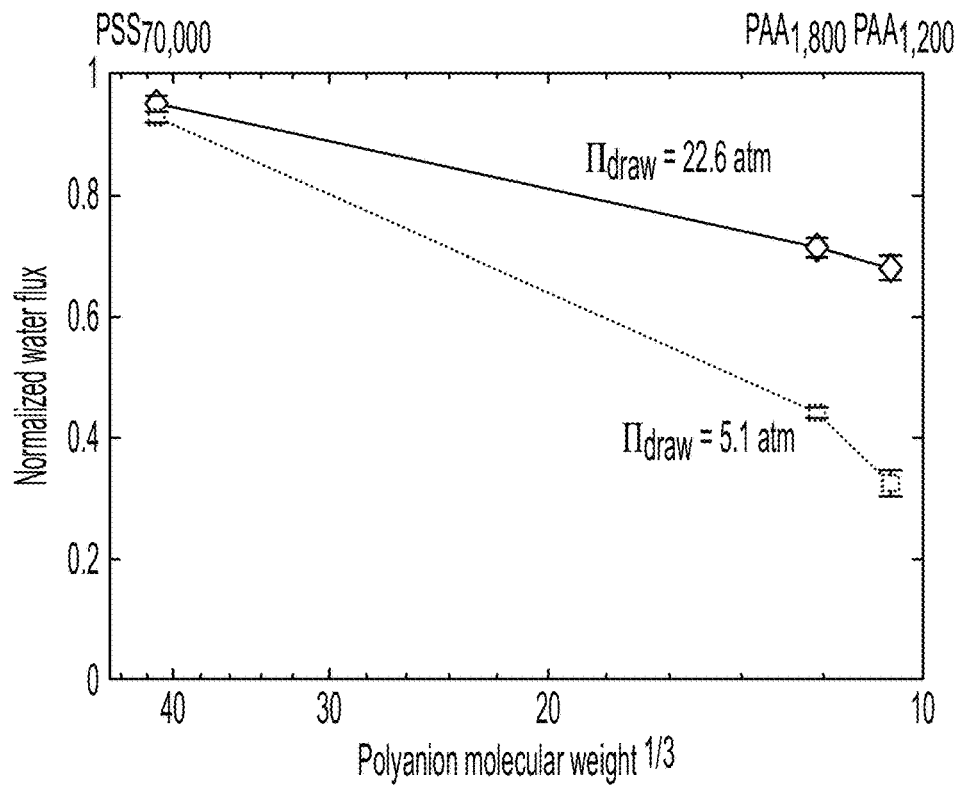
FIG. 15 shows measured water flux under forward osmosis at various draw solution osmotic pressures.

Osmotically driven water flux across the membrane, which did not experience a considerable reduction after the first $PSS_{70,000}$(−):(+)$PAH_{65,000}$ assembly, declined as a result of the following $PAA_{1,800}$(−):(+)$PAH_{17,000}$ treatment (FIG. 15). The larger polyelectrolyte pair seals not only the large water-permeable pores, but also the ones allowing for draw solute leakage. As a consequence, the effective osmotic pressure difference across nanoporous graphene is less compromised from alleviated internal concentration polarization of draw solutes, compensating for diminished contributions to water transport from graphene pores sealed by the assembly. The water flux thus decreased only by 7.2% and 5.0% for draw solution osmotic pressure of 5.1 and 22.6 atm, respectively. However, nearly all of the remaining water-permeable pores were then smaller than the glycerol ethoxylate draw solute and an improvement in effective osmotic pressure difference could hardly be achieved. The assembly of smaller polyelectrolyte pair therefore only compromised the membranes permeance to water, resulting in 50% and 25% drops in water flux for 5.1 and 22.6 atm draw solution, respectively (FIG. 15).

To further diminish residual KCl and NaCl diffusive leakage, polyelectrolyte assembly of even lower molecular weights was performed on the same membrane, using PAA with $M_w$ ~1,200 Da and PAH with $M_w$ ~15,000 Da. 20 mM aqueous solutions of $PAA_{1,200}$ and $PAH_{15,000}$ in 0.5 M NaCl were prepared and their pH values were adjusted to ~9, which was an intermediate point between the initial values of each. The molecular assembly was carried out following the same procedure described above, with care to expose the graphene side only to polyanions and the opposite side with polycations.

Again, the diffusive leakage of both monovalent salts was mitigated by the smallest polyelectrolyte pair (FIG. 15). The membrane's coverage against KCl and NaCl after the $PAA_{1,200}$(−):(+)$PAH_{15,000}$ enhanced from 95.0% to 96.3% and from 95.0% to 96.2%, respectively, amounting to 26.4% and 24.0% reduction in diffusive transport.

Interestingly, KCl and NaCl diffusion exhibited highly comparable coverage after the first polyelectrolyte assembly, and showed almost similar changes to each of the following assembly (FIG. 15). Considering that the hydrated $K^+$ and $Na^+$ ions differ in size with diameters of 0.66 nm and 0.72 nm, respectively, such indistinguishable coverage after the polyelectrolyte assembly may suggest full or partial dehydration of the monovalent ions. If the hydrated monovalent ions coordinate with charges at graphene pores and shed their hydration shells, partially dehydrated ions will experience lower energy barriers traversing the pores. As the remaining permeable pores are almost comparable in size to the hydrated ions, their interaction with the pore charges, functional groups, and presence of the polyanions (PSS and PAA) could alter the energy landscape and allow easier ionic translocation through the pores.

It should be noted that gradually lowering the polyelectrolyte molecular weights for assembly resulted in a continuous drop in residual diffusive leakage of all the measured solutes. During each of the three assembly in series, KCl, for example, experienced a successive reduction in diffusive transport of 56%, 49%, and 27%, respectively, achieving an 84% improvement in mitigating the monovalent salt leakage compared to the value before the assembly. This could be interpreted as lower molecular weight polyelectrolytes selectively assembling across smaller leaky pores, which could not be efficiently mitigated by the larger pairs due to relatively higher entropic barriers for accessing small openings. If the polyelectrolyte treatment were non-selectively blocking leaky pores through adsorption or bilayer formation, reducing the residual transport would have been feasible even with high molecular weight pairs only. Clear dependence of continuous leakage mitigation on polyelectrolyte molecular weight could be another indirect evidence of selective assembly across graphene pores, enabling a sterically governed improvement in membrane selectivity.

Example 7

The following examples describes the quantification of solute rejection using a coated active layer.

Improving solute rejection performance of desalination membranes strongly depends on reducing solute permeability. Methods including interfacial polymerization, atomic layer deposition, or nanoparticle deposition have been performed to improve selectivity of large-area (~cm$^2$) graphene membranes, where use of CVD graphene entails multiscale defects. These efforts proved their effectiveness in sealing of a large fraction of the leaky pores, but incomplete mitigation of diffusive leakage and intrinsic permeability of the sealants led to inadequate rejection of divalent ions and almost no retention of monovalent ions. Considering that it is challenging to improve membrane selectivity without a simultaneous drop in water permeability, large gains in selectivity, with a decline of a lesser degree in water flux, form the basis for measuring solute rejection across nanoporous graphene membranes after polyelectrolyte assembly.

A side-by-side diffusion cell was used to investigate solute rejection under forward osmosis. 16.6 mM NaCl, 16.6 mM MgSO$_4$ or 1 mM Allura Red was introduced, as the feed solution, to the graphene side of the cell to which a graduated cylinder is attached, while the opposite side was filled with glycerol ethoxylate ~1,000 draw solution at a concentration of 26.4 wt. % (~20 bar) and had its open port sealed with a rubber plug. With magnetic bars stirring the solutions on both sides, water transport from the feed to draw side was measured by the liquid level on a graduated cylinder and the resulting concentration changes on the draw side were monitored over time by a conductivity or UV-Vis miniature probe. Rejection experiments for each of the solutes were performed in triplicate, following the osmotic water flux and solute diffusion measurements after each step of polyelectrolyte assembly.

Rejection performance of a membrane was calculated by comparing the absolute measured solute transport to the estimated solute transport across a completely non-rejecting membrane with the same water permeance. Rejection is defined as:

$$R = \left[1 - \frac{(C_D + \Delta C_D)(V_D + \Delta V_D) - C_D V_D}{C_F \Delta V_D}\right] \times 100\%;$$

where $C_D$ and $C_F$ are initial solute concentrations (mol/m$^3$) of draw solution and feed solution, respectively, $\Delta C_D$ denotes increase in concentration the draw solution, $V_D$ is initial volume (m$^3$) of draw solution, and $\Delta V_D$ is increase in draw solution volume. This expression generally estimates how much of reduction in solute transport is retained by the active layer, as compared to completely unimpeded convective transport of solutes.

Figure 16:
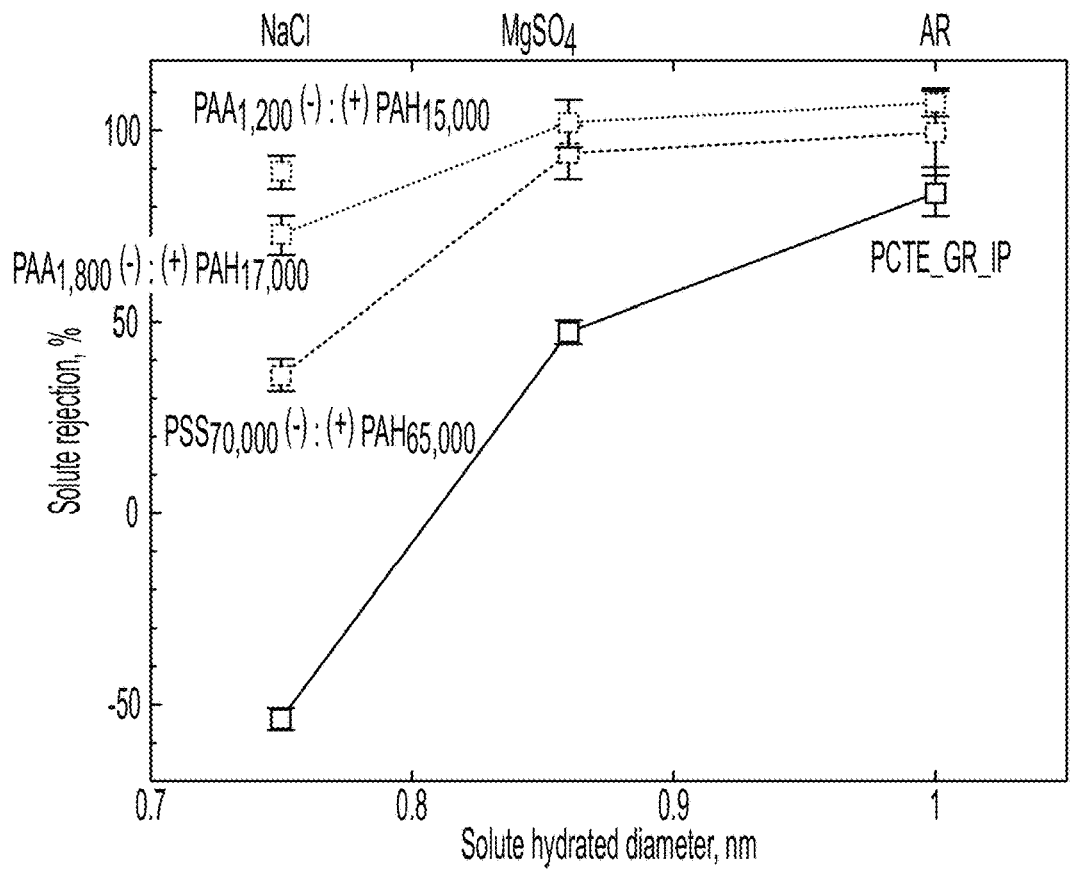
FIG. 16 shows measured solute rejection of NaCl, $MgSO_4$, and Allura Red before and after electrostatic assembly of various polyelectrolytes in the order of decreasing molecular weight.

Prior to any polyelectrolyte assembly, the membrane showed poor rejection of all the solutes tested, with ~53.8%, 46.2%, and 89.7% rejection of NaCl, MgSO$_4$, and Allura Red, respectively (FIG. 16). However mitigation of large, non-selective pores the first PSS$_{70,000}$(−):(+)PAH$_{65,000}$ assembly significantly improved the rejection performance to 34.7%, 94.9%, and 99.6% for each of the solutes. Each of MgSO$_4$ and Allura Red experienced a remarkable decline of 90.6% and 99.0%, respectively, in solute transport under forward osmosis, suggesting the effectiveness of the polyelectrolyte pair in enhancing membrane rejection performance. The membrane selectivity improved to exhibit a positive rejection value, with 64.4% decrease in NaCl transport. On a different membrane prepared following the same procedure, ≥99% rejection of MgSO$_4$ was immediately observed right after the first assembly.

Molecular assembly of smaller polyelectrolytes continued to illustrate excellent capacity in mitigating solute transport under forward osmosis. After the second PAA$_{1,800}$(−):(+)PAH$_{17,000}$ assembly, solute transport of both MgSO$_4$ and Allura Red shrunk to result in exceptional 99.6% and 100.8% rejection, respectively (FIG. 16). This exceptionally high rejection coincides with high (≥99%) coverage against both solutes under diffusion and suggests the polyelectrolyte assembly can maintain its ability to mitigate solute transport under a chemical potential differential amounting to a typical pressure range of reverse osmosis operations. Above 100% rejection in Allura Red is somewhat counterintuitive, but the difficulty of defining a steady-state interval from measurements with extremely low signal-to-noise ratios around the lower limit of the UV-Vis probe calibration range might be responsible for a slight misinterpretation of the signals from near insignificant transport. The membrane also experienced a large promotion in rejection of monovalent NaCl from 34.7% to 68.5%, corresponding to 86.1% reduction in transport.

Figure 17:
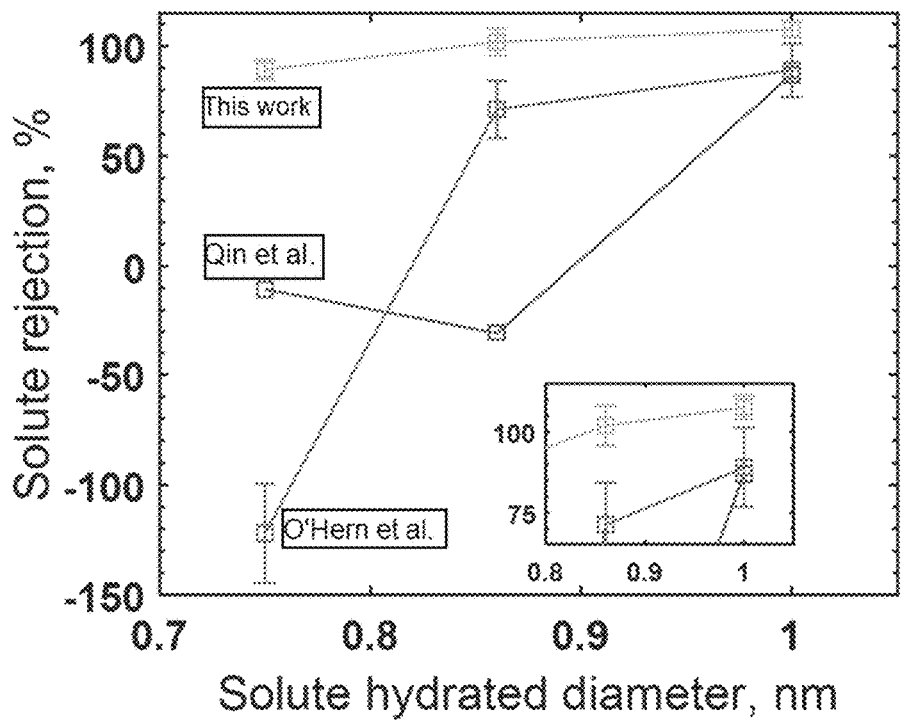
FIG. 17 shows a comparison of measured solute rejection to performance exhibited by conventional centimeter-scale monolayer graphene membranes.

The last PAA$_{1,200}$(−):(+)PAH$_{15,000}$ assembly was capable of diminishing the residual NaCl transport by 71.8% and significantly improved the rejection to 90.2% (FIG. 16). Combined with the ≥99% rejection of MgSO$_4$ and Allura Red, the rejection performance exhibited by the polyelectrolyte assembly is the highest among conventional centimeter-scale monolayer graphene membranes, which especially suffered from almost no rejection of monovalent salts (FIG. 17). The remaining NaCl transport could be due to incomplete (96.3%) coverage to diffusion and inherent permeability of nylon-6,6 plugs to NaCl. It is worth noting that net reduction of 96.1% in osmotically driven NaCl transport was achieved by the three molecular assemblies in series with polyelectrolytes, and outstanding 99.8% and 105.8% mitigation of MgSO$_4$ and Allura Red transport was already observed even after the first two assemblies. The molecular assembly could be a reliable method to improve membrane selectivity for robust separation processes with high stability.

It is also notable that compromise in measured water flux during the rejection experiments was not as considerable as solute transport mitigation. Transport of solutes under an osmotic pressure difference has coupled contributions from both diffusive and convective components. Therefore, mitigated solute transport could partly come from compromised water flux, if it was across pores larger than the solutes. After the first two polyelectrolyte assembly, water flux experienced 21.1% and 33.2% decrease during $MgSO_4$ and Allura Red rejection, respectively, and the third assembly resulted in net reduction of 37.3% in water transport measured in NaCl rejection. It thus can be concluded that a remarkable ≥95% transport reduction in all the measured solutes is mostly from mitigated diffusive leakage, not from diminished water flux.

This observation may suggest that solutes are more sensitive to mitigation of leaky pores than water molecules are, or a significant fraction of water transport is directed towards graphene pores smaller than the solutes. Near complete rejection towards the divalent salts and organic molecules (~1 nm), combined with remarkably improved NaCl rejection of ~90%, demonstrates that large-area nanoporous graphene with molecular assembly could be harnessed in nanofiltration and present a reliable platform to develop desalination membranes.

Table 1 shows transport measurements during solute rejection experiments of 16.6 mM NaCl, 16.6 mM $MgSO_4$, and 1 mM Allura Red under forward osmosis, at draw solution osmotic pressure of 22.56 atm. The graphene membranes, following interfacial polymerization, was bombarded with gallium ions at an incidence angle of 52°, density of $0.55\times10^{13}$ cm$^{-2}$, and acceleration voltage of 8 kV, and etched with 50 s of oxygen plasma treatment.

TABLE 1

Transport measurements during solute rejection experiments

|  |  | PCTE + Graphene + IP | +$PSS_{70,000}^{(-)}$: $^{(+)}PAH_{65,000}$ | +$PAA_{1,800}^{(-)}$: $^{(+)}PAH_{17,000}$ | +$PAA_{1,200}^{(-)}$: $^{(+)}PAH_{15,000}$ |
|---|---|---|---|---|---|
| Solute | NaCl | 7.16E−06 | 2.55E−06 | 9.94E−07 | 2.81E−07 |
| permeance | $MgSO_4$ | 2.09E−06 | 1.97E−07 | 1.47E−08 | — |
| (m/s) | Allura Red | 3.54E−07 | 3.52E−09 | −1.54E−08 | — |
| Reduction in | NaCl | — | 64.4 | 86.1 | 96.1 |
| solute | $MgSO_4$ | — | 90.6 | 99.3 | — |
| permeance (%) | Allura Red | — | 99.0 | 104.4 | — |
| Water flux | NaCl | 4.66E−06 | 3.89E−06 | 3.16E−06 | 2.92E−06 |
| (m/s) | $MgSO_4$ | 3.89E−06 | 3.71E−06 | 3.07E−06 | — |
|  | Allura Red | 3.47E−06 | 3.77E−06 | 2.32E−06 | — |
| Reduction in | NaCl | — | 16.3 | 32.0 | 37.3 |
| water flux (%) | $MgSO_4$ | — | 4.7 | 21.1 | — |
|  | Allura Red | — | −8.6 | 33.2 | — |
| Solute | NaCl | −53.8 | 34.7 | 68.5 | 90.2 |
| rejection (%) | $MgSO_4$ | 46.2 | 94.9 | 99.7 | — |
|  | Allura Red | 89.7 | 99.6 | 100.8 | — |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A membrane comprising:
   a substrate;
   an active layer comprising a first surface, a second surface, and a plurality of channels passing through the active layer from the first surface to the second surface, wherein the first surface is directly opposite the second surface and the active layer is disposed on the substrate, wherein the active layer comprises graphene or hexagonal boron nitride, and wherein the active layer is a single sheet;
   a first material at least partially in contact with the first surface, wherein the first material comprises a first polyelectrolyte; and
   a second material at least partially in contact with the second surface, wherein the second material comprises a second polyelectrolyte that is different from the first polyelectrolyte, and
   wherein the first material and the second material are configured such that there is at least one interaction between the first material and the second material through at least one channel of the plurality of channels, thus affecting a through-size of the at least one channel.

2. The membrane of claim 1, wherein the active layer is an atomically thin layer.

3. The membrane of claim 1, wherein the at least one interaction between the first material and the second material is a non-covalent interaction.

4. The membrane of claim 3, wherein the non-covalent interaction is an electrostatic interaction, a hydrophobic interaction, a solvation interaction, and/or a van der Waals interaction.

5. The membrane of claim 1, wherein the first polyelectrolyte is positively charged.

6. The membrane of claim 5, wherein the first polyelectrolyte is polyallylamine, polyethylenimine, and/or poly(diallyldimethylammonium).

7. The membrane of claim 1, wherein the first material has an average molecular weight of greater than or equal to 1,000 Da and less than or equal to 500,000 Da.

8. The membrane of claim 1, wherein the second polyelectrolyte is negatively charged.

9. The membrane of claim 8, wherein the second polyelectrolyte is polystyrene sulfonate and/or polyacrylic acid.

10. The membrane of claim 1, wherein the second material has an average molecular weight of greater than or equal to 1,000 Da and less than or equal to 500,000 Da.

11. The membrane of claim 1, wherein the first material has an average molecular weight of greater than or equal to 500 Da and less than or equal to 500,000 Da.

12. The membrane of claim 1, wherein the second material has an average molecular weight of greater than or equal to 500 Da and less than or equal to 500,000 Da.

13. The membrane of claim 1, wherein the membrane is a filtration membrane.

14. The membrane of claim 1, wherein the through-size of the at least one channel is a diameter of the at least one channel.

15. The membrane of claim 1, wherein the at least one interaction between the first material and the second material through the at least one channel is configured to completely seal the at least one channel.

16. The membrane of claim 1, wherein the at least one channel of the plurality of channels has a first through-size of greater than or equal to 0.5 nm and less than or equal to 1 micrometer.

17. The membrane of claim 16, wherein the first material and the second material are configured to leave at least one channel of the plurality of channels having a second through-size of less than 0.5 nm unaffected.

18. The membrane of claim 1, wherein the active layer consists of the single sheet.

19. A membrane comprising:
    a substrate;
    an active layer comprising a first surface, a second surface, and a plurality of channels passing through the active layer from the first surface to the second surface, wherein the first surface is directly opposite the second surface and the active layer is disposed on the substrate, and wherein the active layer is a single sheet;
    a first material at least partially in contact with the first surface, wherein the first material comprises a first polyelectrolyte; and
    a second material at least partially in contact with the second surface, wherein the second material comprises a second polyelectrolyte that is different from the first polyelectrolyte, and
    wherein the first material and the second material are configured such that there is at least one interaction between the first material and the second material through channels having a first through-size of greater than or equal to 0.5 nm and less than or equal to 1 micrometer, thus affecting the first through-size of the channels, while leaving channels having a second through-size of less than 0.5 nm unaffected.

20. The membrane of claim 19, wherein the active layer comprises at least one of graphene, hexagonal boron nitride, molybdenum disulfide, vanadium pentoxide, silicon, doped-graphene, graphene oxide, hydrogenated graphene, fluorinated graphene, a covalent organic framework, a metal-organic framework, a layered transition metal dichalcogenide, a layered Group-IV and Group-III metal chalcogenide, silicene, germanene, and a layered binary compound of a Group IV element and a Group III-V element.

21. The membrane of claim 19, wherein the first through-size and the second through-size of the channels is a diameter of the channels.

22. The membrane of claim 19, wherein the at least one interaction between the first material and the second material through the channels having the first through-size is configured to completely seal the channels having the first through-size.

* * * * *